(12) United States Patent
Izumino et al.

(10) Patent No.: US 7,654,908 B2
(45) Date of Patent: Feb. 2, 2010

(54) TRIPOD TYPE CONSTANT VELOCITY UNIVERSAL JOINT

(75) Inventors: Junichi Izumino, Shizuoka-ken (JP); Minoru Ishijima, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/101,195

(22) Filed: Apr. 11, 2008

(65) Prior Publication Data

US 2008/0194341 A1 Aug. 14, 2008

Related U.S. Application Data

(62) Division of application No. 11/189,103, filed on Jul. 26, 2005, now abandoned.

(30) Foreign Application Priority Data

Aug. 3, 2004 (JP) ............................. 2004-227037
Aug. 3, 2004 (JP) ............................. 2004-227055

(51) Int. Cl.
*F16D 3/205* (2006.01)
(52) U.S. Cl. ...................................... 464/111; 464/905
(58) Field of Classification Search ................. 464/111, 464/123, 124, 173–175, 905
See application file for complete search history.

(56) References Cited

U.S. PATENT DOCUMENTS

| 5,538,473 A | 7/1996 | Busch et al. |
| 5,797,798 A * | 8/1998 | Bastien et al. .............. 464/111 |
| 6,200,224 B1 * | 3/2001 | Sugiyama et al. ........... 464/111 |
| 6,547,669 B1 * | 4/2003 | Neviani ...................... 464/175 |
| 6,699,134 B2 * | 3/2004 | Sams et al. ................. 464/111 |
| 6,758,758 B2 | 7/2004 | Perrow |
| 2004/0157667 A1 | 8/2004 | Ishijima et al. |

FOREIGN PATENT DOCUMENTS

| EP | 0 441 671 A1 * | 8/1991 | ................. 464/111 |
| EP | 1 533 535 A1 | 5/2005 | |
| FR | 1.268.690 * | 6/1961 | ................. 464/111 |
| JP | 08-338439 A | 12/1996 | |
| WO | WO 02/33276 A2 | 4/2002 | |

* cited by examiner

*Primary Examiner*—Greg Binda
(74) *Attorney, Agent, or Firm*—Arent Fox LLP

(57) ABSTRACT

A tripod type constant velocity universal joint that includes an outer joint member having three track grooves axially extending on an inner circumferential surface thereof; an inner joint member having three radially projecting trunnions; a boot fitted to an outer periphery of the outer joint member at an end portion and to a shaft extended from the inner joint member at another end portion to seal an inner region of the joint; wherein the outer joint member includes a first reduced-thickness portion on an outer periphery thereof in a region corresponding to the region between the track grooves, and a second reduced-thickness portion on an outer periphery thereof in a region corresponding to the region where the track grooves are located; and wherein the second reduced-thickness portion is of a groove shape axially extending with respect to the outer joint member.

4 Claims, 14 Drawing Sheets

FIG. 3A
FIG. 3B
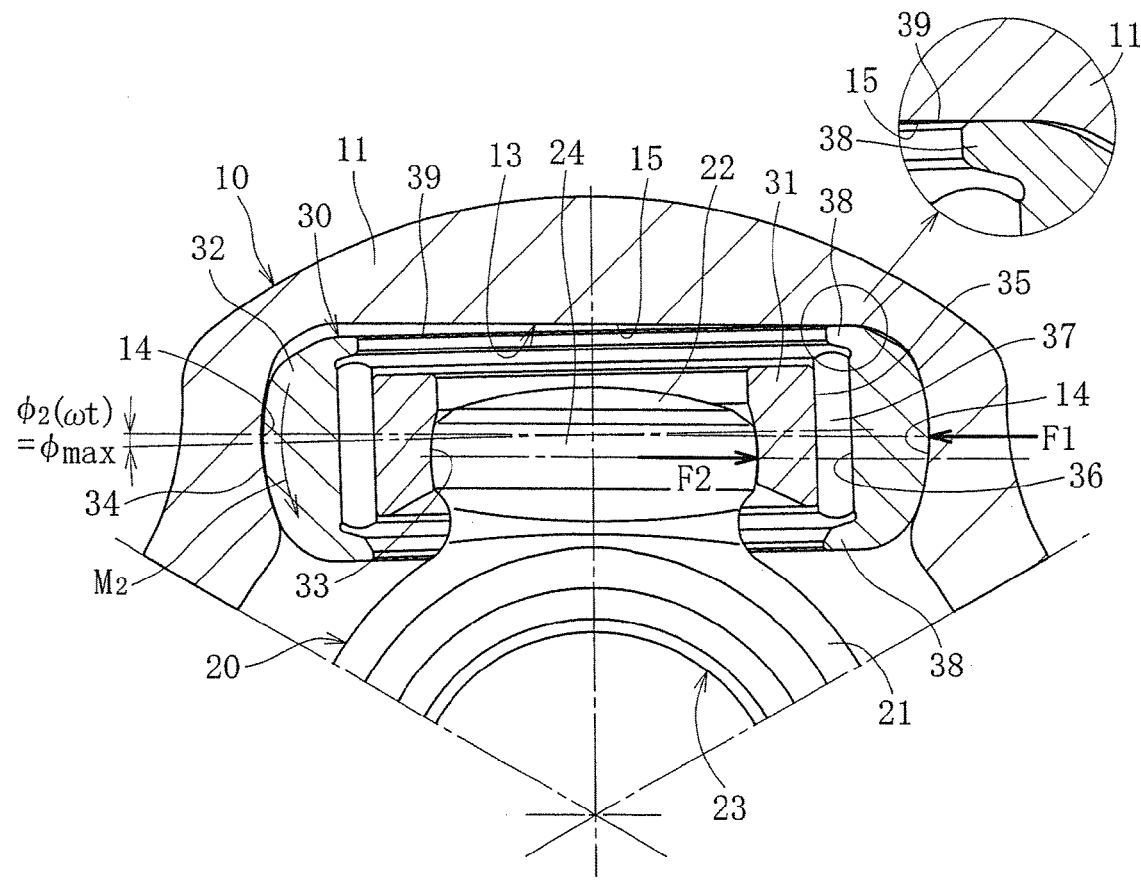
FIG. 4
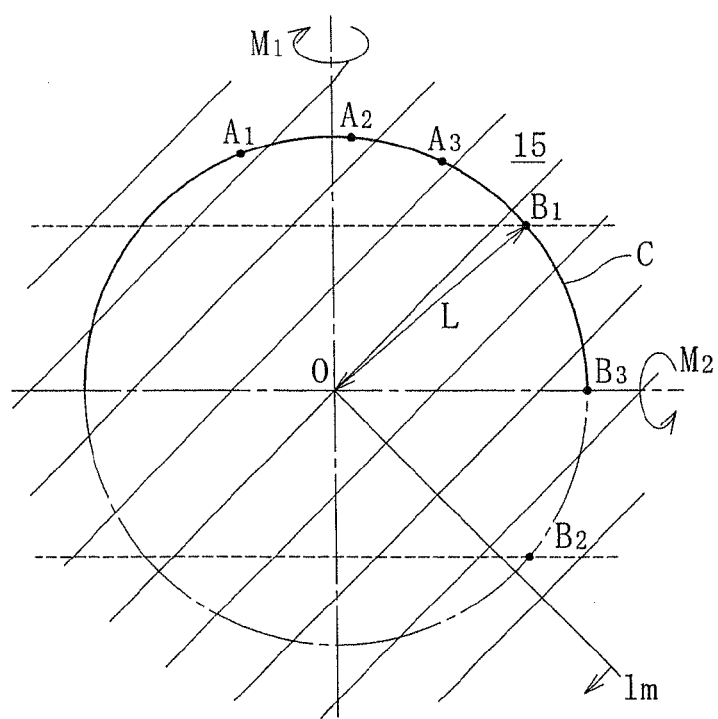

FIG. 10A PRIOR ART
FIG. 10B
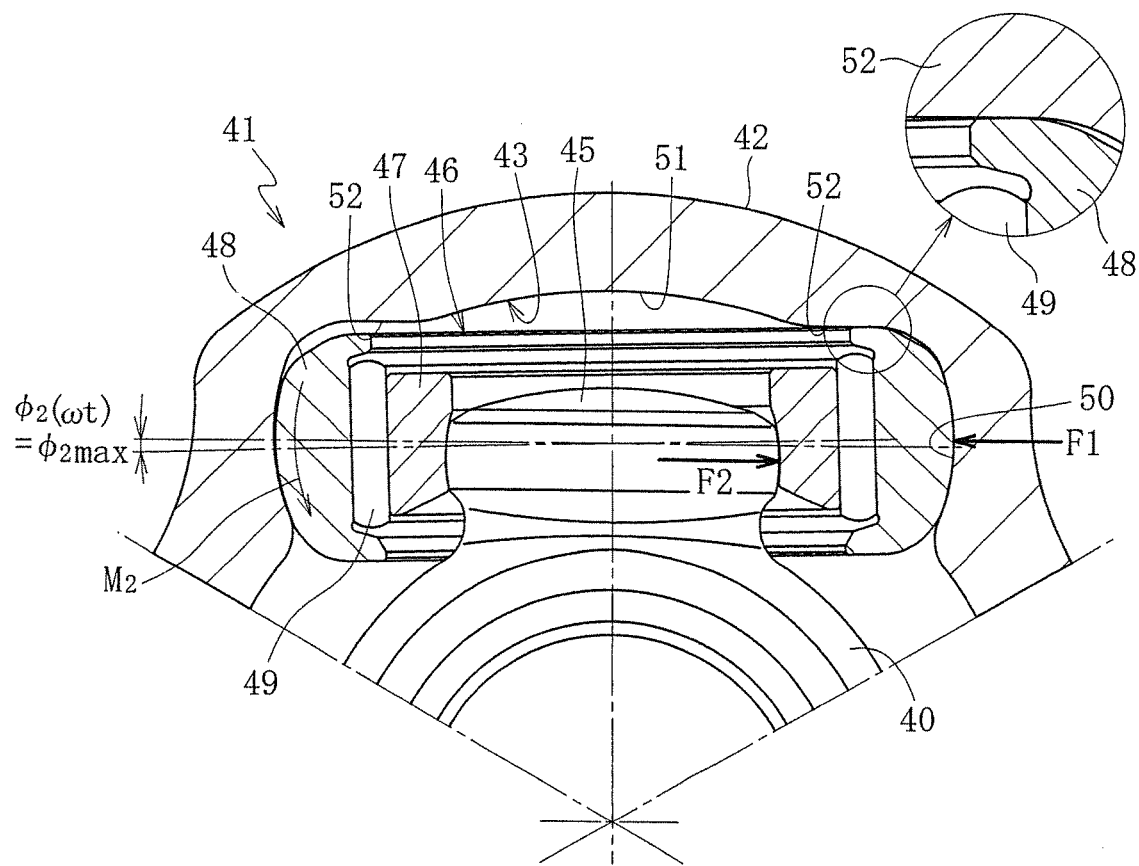
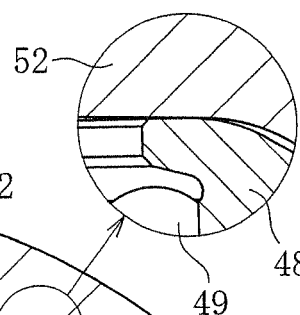
FIG. 11 PRIOR ART
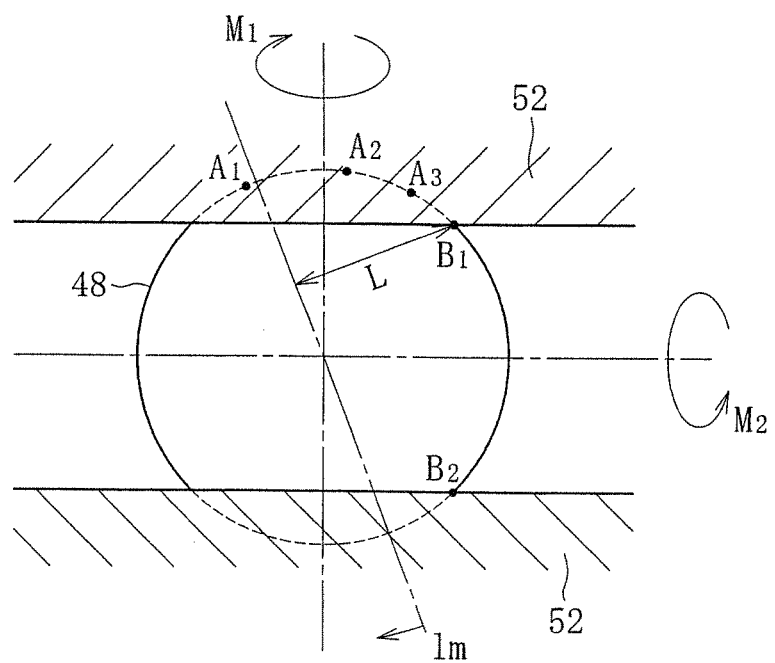

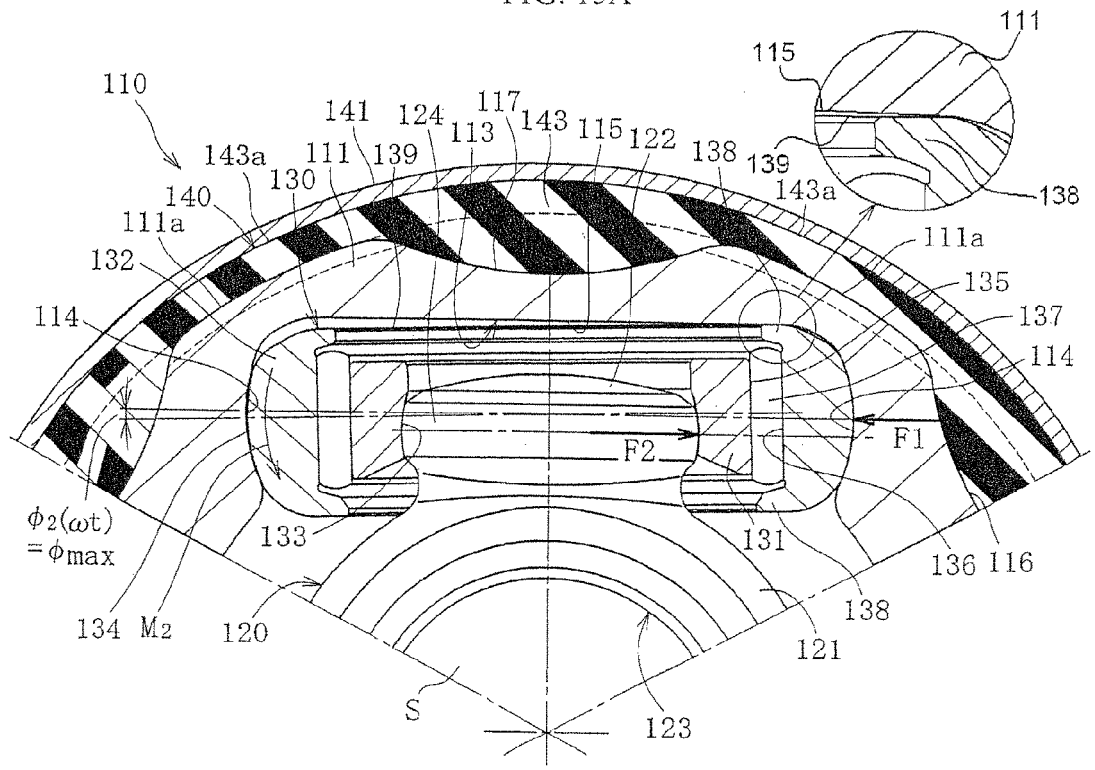
FIG. 15A
FIG. 15B
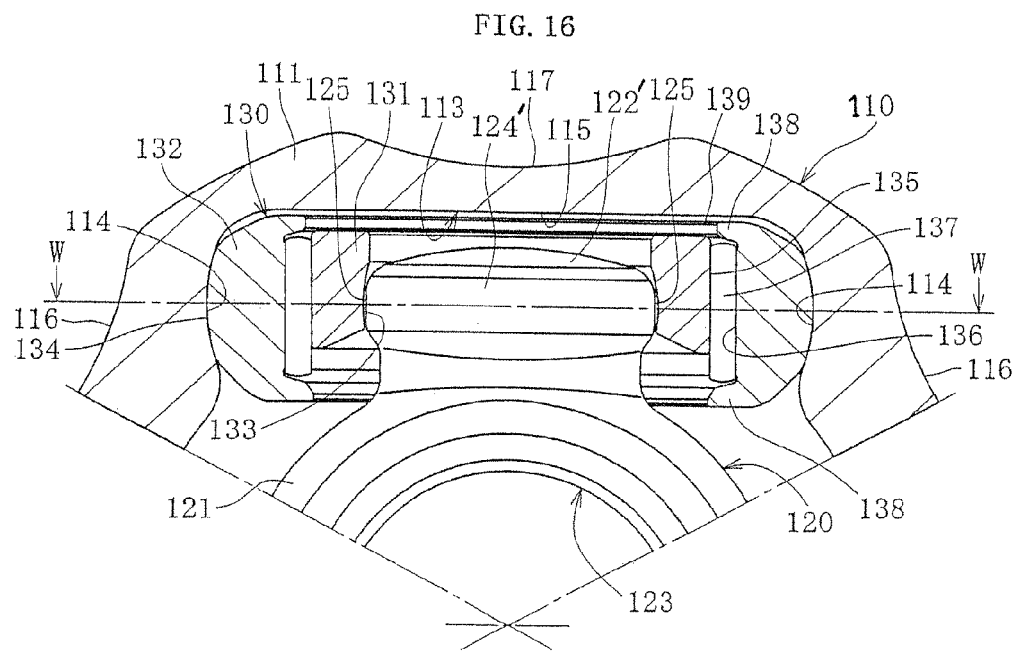
FIG. 16

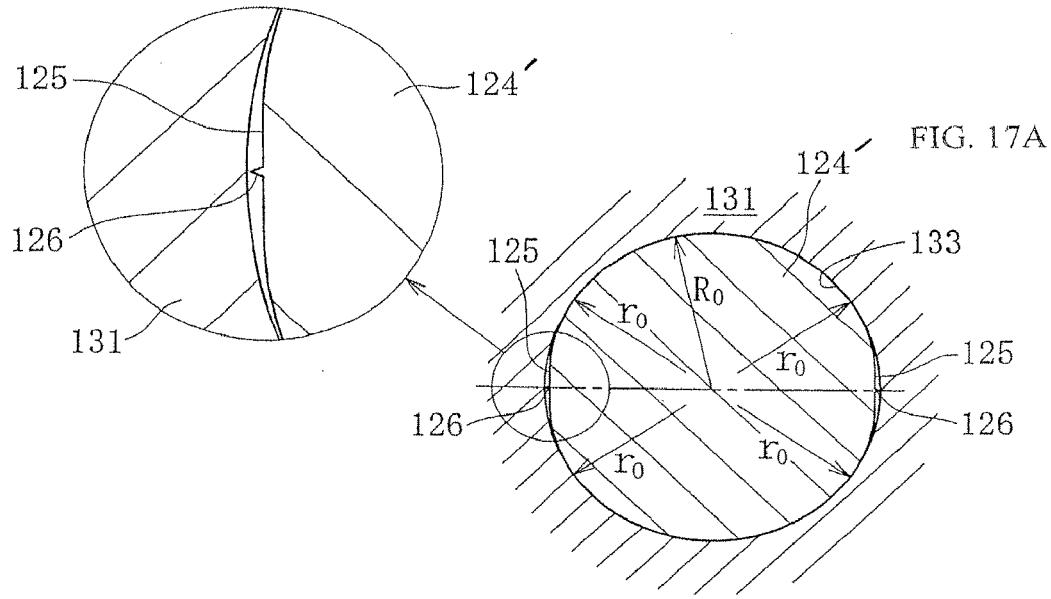
FIG. 17B
FIG. 17A
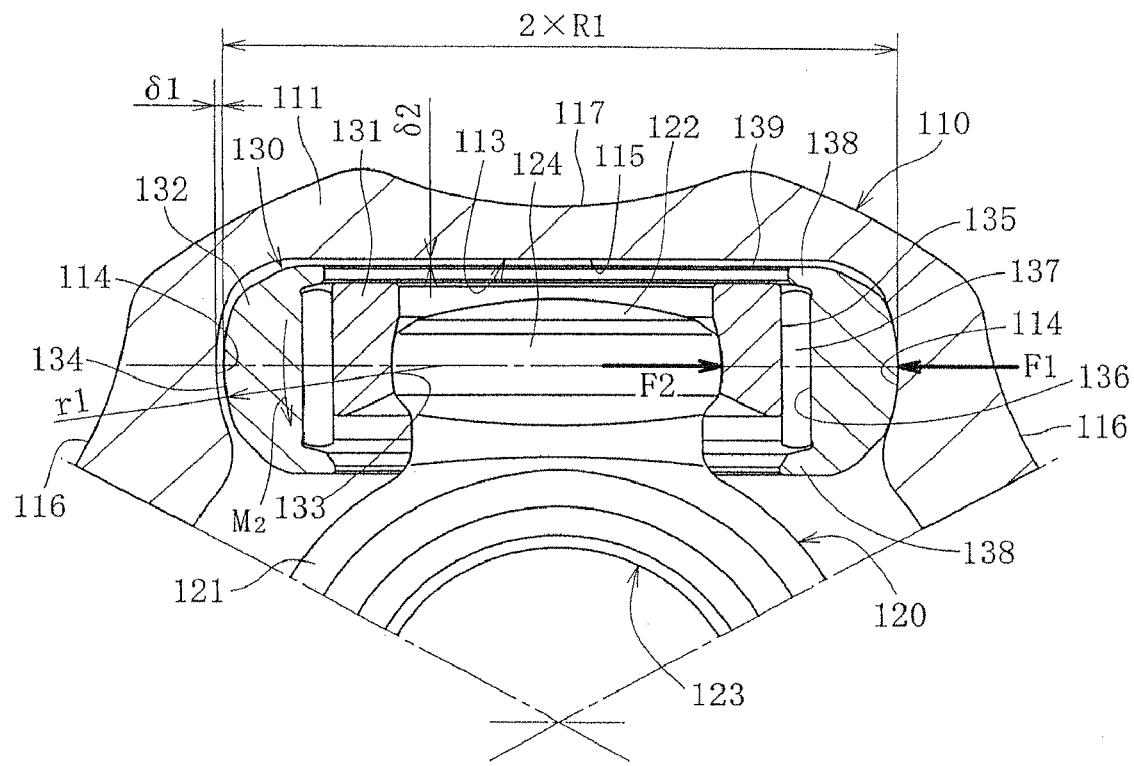
FIG. 18

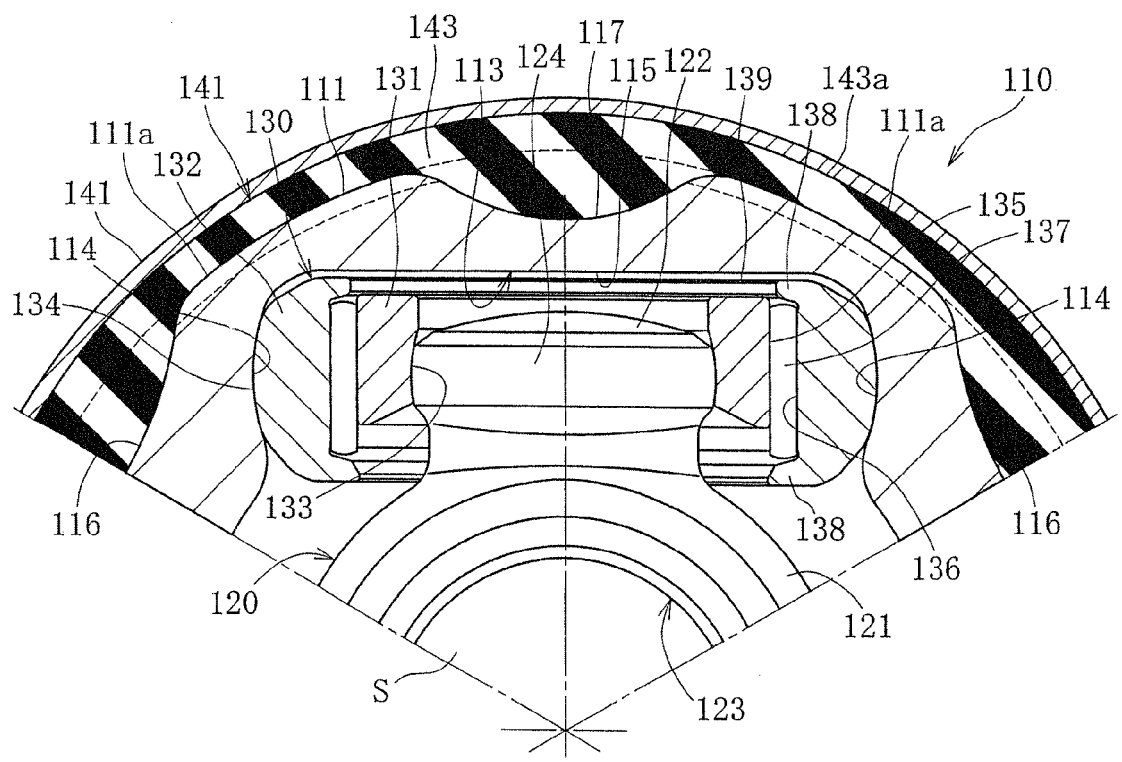
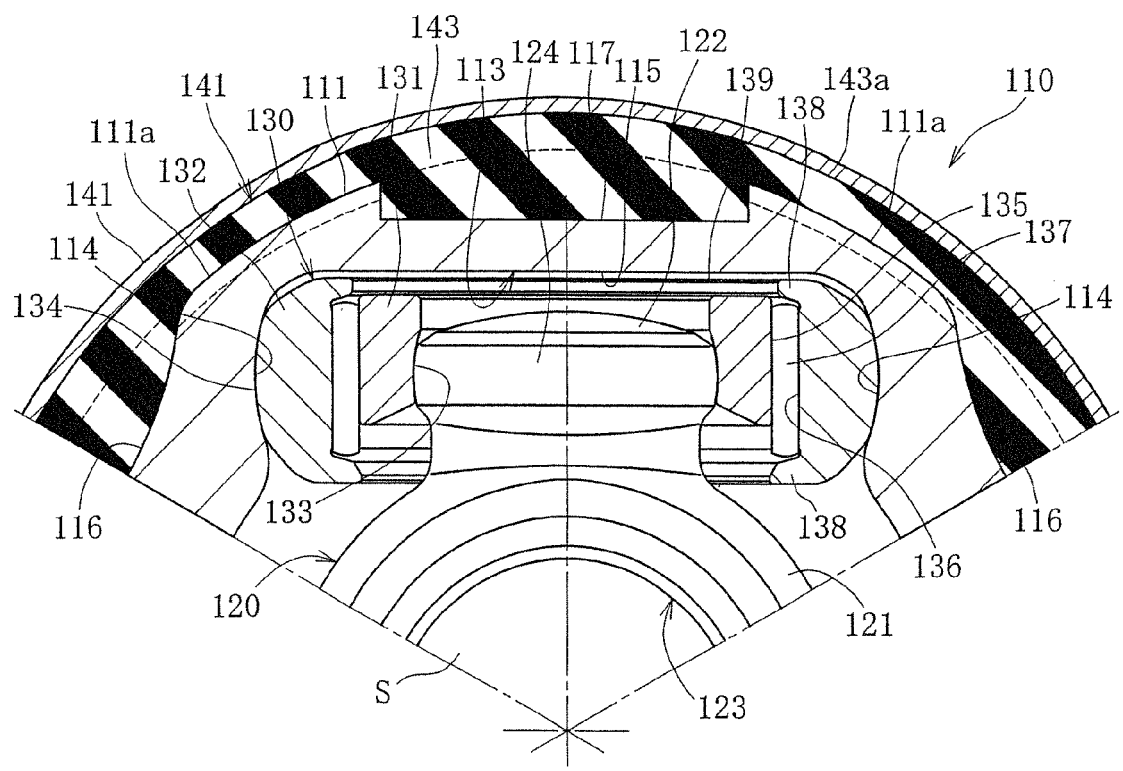

US 7,654,908 B2

TRIPOD TYPE CONSTANT VELOCITY UNIVERSAL JOINT

CROSS REFERENCE TO RELATED APPLICATIONS

The application is a Divisional Application of and claims priority to U.S. patent application Ser. No. 11/189,103, filed Jul. 26, 2005, now abandoned, and entitled TRIPOD TYPE CONSTANT VELOCITY UNIVERSAL JOINT. The entire content of application Ser. No. 11/189,103 is incorporated herein by reference.

BACKGROUND OF THE INVENTION

1. Field of the Invention

The present invention relates to a tripod type constant velocity universal joint to be incorporated in for example a driving system of an automobile, for transmission of a rotational force mainly between non-linearly oriented rotating shafts.

2. Description of the Related Art

FIG. 8 is a cross-sectional view showing a conventional tripod type constant velocity universal joint 41, for example disclosed in JP-A No. 2002-147482, including an inner joint member 44 having three trunnions 45 radially projecting from its outer circumferential surface, respectively engaged via a roller assembly 46 in each of three track grooves 43 provided on an inner circumferential surface of an outer joint member 42, so as to transmit a torque between the outer joint member 42 and the inner joint member 44, while allowing angular and axial displacement with respect to each other.

The tripod type constant velocity universal joint 41 is of a double roller type, in which the roller assembly 46 includes two rollers, namely an inner roller 47 and an outer roller 48. The inner roller 47 is spherically and pivotally fitted to the trunnion 45. The outer roller 48 is relatively rotatable and movable in an axial direction with respect to the inner roller 47, via a plurality of needle rollers 49 interposed between the cylindrical outer circumferential surface of the inner roller 47 and the cylindrical inner circumferential surface of the outer roller 48. On the inner circumferential surface of the outer joint member 42, a roller guide section 50 is provided adjacent to each circumferential edge of the track groove 43. The roller guide section 50 is a curved recess having an arc-shaped cross-section. The outer circumferential surface of the outer roller 48 has a generatrix curvature radius generally the same as that of the roller guide section 50, so that the surfaces of the outer roller 48 and the roller guide section 50 are closely butted when a torque Is applied.

Referring to FIG. 9, when a torque is applied to the tripod type constant velocity universal joint 41 at an operating angle θ, i.e. when an axial line of the outer joint member 42 and an axial line of the inner joint member 44 are inclined by the angle θ, the trunnions 45 swing along the respective mating track grooves 43 as indicated by the arrow a in FIG. 9, along with the rotation of the inner joint member 44. At this stage, the outer roller 48 reciprocates along the track groove 43, while rolling on the load side roller guide section 50.

When the trunnion 45 swings along the track groove 43, the inner roller 47 pivotally rotates with respect to the trunnion 45, thereby generating a frictional force against the trunnion 45. The frictional force in turn generates a spin moment $M_1$ in the roller assembly 46, so as to change an inclination $\phi_1 (\omega_r)$ of the outer joint member 42 in an axial cross-section.

The swinging motion of the trunnion 45 along the track groove 43 also displaces a position of the front end portion of the trunnion 45 in a radial direction with respect to the outer joint member 42. At this moment, the inner roller 47 follows the trunnion 45 so as to be displaced in a radial direction of the outer joint member 42, while the outer roller 48 is detained by the track groove 43 and thus inhibited from moving in a radial direction of the outer joint member 42, and hence the inner roller 47 and the outer roller 48 relatively move in an axial direction. Therefore, as shown in FIG. 10, a line of action of a force $F_2$ loaded on the inner roller 47 from the trunnion 45 is offset with respect to a line of action of a force $F_1$ loaded on the outer roller 48 from the roller guide section 50, which generates a spin moment $M_2$ in the roller assembly 46 so as to change an inclination $\phi_2 (\omega_r)$ of the outer joint member 42 in a cross-section orthogonal to an axial line.

Normally the spin moments $M_1$, $M_2$ are simultaneously generated, and the inclinations $\phi_1 (\omega_r)$, $\phi_2 (\omega_r)$ of the roller assembly 46 change with time depending on the environment of use and the rotation phase angle of the inner joint member 44. In the case of transmitting a relatively great torque such as in a driving system of an automobile, the spin moments $M_1$ and $M_2$ cause the roller assembly 46 to incline by a larger angle. When the roller assembly 46 is largely inclined, the outer roller 48 comes in contact with the non-load side roller guide section 50 as shown in FIG. 10A, thus increasing the rolling resistance of the outer roller 48. This incurs an excessive frictional force inside the joint, which leads to an increase in tertiary rotational axial force. Such axial force often provokes vibration (so called "shudder") of the vehicle in which the tripod type constant velocity universal joint 41 is incorporated.

A solution to avoid such a phenomenon is, according to the cited document and as shown in FIGS. 8 to 10, providing a flange portion 52 on both sides of the bottom portion 51 of the track groove in a circumferential direction, so as to sustain a facet of the outer roller 48 inclined by the spin moments $M_1$, $M_2$ with the flange portion 52, thus to suppress the inclination of the roller assembly 46 to keep the outer roller 48 from contacting the non-load side roller guide section 50 to a maximal extent.(Referring to JP-A No. 2002-147482 for example)

In the conventional tripod type constant velocity universal joint 41, if the spin moments $M_1$, $M_2$ continue to be generated even after the roller assembly 46 has been inclined so much that a facet of the outer roller 48 contacts the flange portion 52 (see FIG. 10B), a frictional force is generated between the outer roller 48 and the flange portion 52. Referring to FIG. 11, when a facet of the outer roller 48 is in one-point contact with the flange portion 52 via a point in a region opposing the flange portion 52 (for example, $A_1, A_2, A_3$), the inclination of the roller assembly 46 with respect to the flange portion 52 is maintained at the same angle as the maximum value $\phi_{2max}$ (Ref. FIG. 10A) of $\phi_2 (\omega_r)$. However, if a phase of the center of moment $l_m$ is displaced after the outer roller 48 has contacted a facet of the flange portion 52 via the point $B_1$, the inclination of the roller assembly 46 with respect to the flange portion 52 exceeds $\phi_{2max}$. A maximum inclination of the roller assembly 46 with respect to the flange portion 52 is the maximum value $\phi_{1max}$ (Ref. FIG. 9) of $\phi_1 (\omega_r)$ created by the spin moment $M_1$, which is reached when the outer roller 48 has made two-point contact with both flange portions 52, i.e. the points B1 and B2. While the outer roller 48 is in one-point contact with a facet of the flange portion 52 the contact point remains at $B_1$, however since a phase of the center of moment $l_m$ is gradually displaced, a distance L from the contact point $B_1$ between the outer roller 48 and the flange portion 52 to the center of moment $l_m$ (hereinafter, "distance between contact point and center L") gradually becomes shorter. A minimum value of the distance between contact point and center L is the distance between the point $B_1$ and the center of the spin moment $M_1$. When the distance between contact point and center L becomes shorter, the contact force of the outer roller 48 applied to the flange portion 52 becomes greater, and resultantly an excessive frictional force may be generated between the outer roller 48 and the flange portion 52.

SUMMARY OF THE INVENTION

The present invention has been conceived in view of the foregoing problem, with an object to provide a tripod type constant velocity universal joint that can restrain generation of an excessive frictional force inside the joint because of the rotation phase angle of the inner joint member, thereby suppressing vibration and achieving higher rotation durability.

To achieve the foregoing object, the present invention provides a tripod type constant velocity universal joint comprising an outer joint member including three track grooves axially extending on an inner circumferential surface thereof and a pair of roller guide sections located on the respective sides of the track groove in a circumferential direction; an inner joint member having three radially projecting trunnions; an outer roller rotatably located inside the roller guide section of the outer joint member; and an inner roller spherically fitted to the trunnion of the inner joint member so as to be pivotally rotatable, and to support the outer roller permitting relative rotation and relative axial movement; wherein a bottom portion of the track groove of the outer joint member is a flat plane located close to a facet of the outer roller, so that the facet of the outer roller inclined due to rotation of the inner joint member is supported by the track groove bottom portion, when a torque is applied with the inner joint member and the outer joint member oriented with a certain operating angle.

In the tripod type constant velocity universal joint thus constructed, upon applying a torque with the inner joint member oriented with a certain operating angle with respect to the outer joint member, the trunnion of the inner joint member swings along the track groove of the outer joint member, and a front end portion of the trunnion is radially displaced with respect to the outer joint member. This causes the outer roller to be inclined with respect to the track groove bottom portion, owing to a spin moment generated by the swinging motion of the trunnion and so on. When such a spin moment exceeds a predetermined value, a facet of the outer roller obtains a support of the track groove bottom portion.

Since the track groove bottom portion is formed in a flat plane, a contact angle between the outer roller and the track groove bottom portion is maintained at a predetermined angle despite the rotation phase angle of the inner joint member is changed. By contrast in the conventional structure, as shown in FIG. 11, when a facet of the outer roller 48 is in one-point contact with the flange portion 52 via a point in a region opposing the flange portion 52 (for example, $A_1, A_2, A_3$), the inclination of the roller assembly 46 with respect to the flange portion 52 is maintained at a predetermined angle. However, during a period after the outer roller 48 has made one-point contact with a facet of the flange portion 52 via the point $B_1$, until the outer roller 48 makes two-point contact with a facet of the flange portion 52 at the points $B_1$ and $B_2$, the inclination of the roller assembly 46 gradually becomes greater. Accordingly, in the tripod type constant velocity universal joint according to the present invention, provided that a clearance between a facet of the outer roller and the track groove bottom portion in an unloaded state is the same as the clearance between a facet of the outer roller 48 and the flange portion 52, the roller assembly is restricted from being inclined compared with the conventional structure, when the contact point between the outer roller and the track groove bottom portion is located in a region corresponding to between the flange portions 52 in the conventional structure, and thus the outer roller is kept from contacting the non-load side roller guide section to a maximal extent.

Further, since the track groove bottom portion is formed in a flat plane, the contact point between the outer roller and the track groove bottom portion moves along a predetermined arc along with the rotation of the inner joint member, Because of such motion, the distance between contact point and center, i.e. from the contact point between the outer roller and the track groove bottom portion to the center of moment is maintained at a predetermined length despite the change in rotation phase angle of the inner joint member. By contrast in the conventional structure, the distance between contact point and center L is maintained at a predetermined length while a facet of the outer roller 48 is contacting the flange portion 52 via the points in a region opposing the flange portion 52 (such as $A_1, A_2, A_3$), however during a period after the outer roller 48 has made one-point contact with a facet of the flange portion 52 via the point $B_1$, until the outer roller 48 makes two-point contact with a facet of the flange portion 52 at the points $B_1$ and $B_2$, the distance between contact point and center L gradually becomes shorter. Accordingly, in the tripod type constant velocity universal joint according to the present invention, provided that a clearance between a facet of the outer roller and the track groove bottom portion in an unloaded state is the same as the clearance between a facet of the outer roller 48 and the flange portion 52, the distance between contact point and center becomes longer than in the conventional structure, when the contact point between the outer roller and the track groove bottom portion is located in a region corresponding to between the flange portions 52 in the conventional structure, and therefore a frictional force generated at this stage between the outer roller and the track groove bottom portion is alleviated.

As already stated, in the tripod type constant velocity universal joint according to the present invention, the bottom portion of the track groove between the roller guide sections of the outer joint member is formed in a flat plane, so that the facet of the outer roller is supported by the track groove bottom portion. Such a structure suppresses an increase in rolling resistance of the outer roller with respect to the non-load side roller guide section, as well as an increase in frictional force between the outer roller and the track groove bottom portion, originating from an environment of use or a rotation phase angle of the inner joint member. Consequently, a frictional force inside the joint is restrained and a tertiary rotational axial force is reduced, which results in upgrading the rotation durability of the joint.

The present invention also provides a tripod type constant velocity universal joint having a weight-reduced outer joint member, yet maintaining the retention performance level of a boot. To achieve such an object, the present invention provides a tripod type constant velocity universal joint comprising a boot fitted to an outer periphery of the outer joint member at an end portion and to a shaft extended from the inner joint member at the other end portion so as to seal an inner region of the joint; wherein the track groove bottom portion formed in a flat plane is located close to a facet of the outer roller; the outer joint member includes a first reduced-thickness portion on an outer periphery thereof in a region corresponding to the region between the track grooves, and a second reduced-thickness portion on an outer periphery thereof in a region corresponding to the region where the track grooves are located; and the second reduced-thickness portion is of a groove shape axially extending with respect to the outer joint member.

In the tripod type constant velocity universal joint thus constructed, the second reduced-thickness portion is formed in a groove shape having a rectangular or a curved cross-section. Accordingly, reducing the thickness in the same amount as a conventional structure, wherein a region on an outer periphery of the outer joint member corresponding to the track groove is scraped off to be flat, can increase the circumferential length of a maximum rotation radius portion of the outer joint member. The thickness reduction amount herein referred to means a volume of space enclosed by a Cylinder having a radius equal to the maximum rotation radius of the outer joint member and the second reduced-thickness portion. The increase in circumferential length of the maximum rotation radius portion of the outer joint member leads to an increase in inner circumferential length of a maximum inner diameter portion of the boot fitted to the outer joint member, and hence in circumferential length of a mechanism that prevents a position shift in an axial direction between the outer joint member and the boot. Consequently, the boot acquires improved retention capability and upgraded sealing effect between the outer joint member and the boot.

As stated above, in the tripod type constant velocity universal joint according to the present invention, the track groove bottom portion of the outer joint member is formed in a flat plane and located close to a facet of the outer roller, and besides the outer joint member includes the second reduced-thickness portion on an outer periphery thereof in a region corresponding to the region where the track grooves are located. Therefore, the weight of the tripod type constant velocity universal joint can be reduced, yet securing sufficient retention capability of the boot.

BRIEF DESCRIPTION OF THE DRAWINGS

FIG. 3A is an enlarged fragmentary cross-sectional view taken orthogonally to an axial direction, showing the tripod type constant velocity universal joint according to the first embodiment of the present invention, in which a torque is applied with an operating angle θ between the outer joint member and the inner joint member. FIG. 3B is an enlarged view showing facet 39 of the outer roller as supported by the track groove bottom portion 15 in contact therewith when the roller assembly 30 is caused to incline by the spin moment $M_1$, $M_2$;

FIG. 4 is a graphic representation showing an orbit of a contact point between a facet of the outer roller and a track groove bottom portion;

FIG. 10A is an enlarged fragmentary cross-sectional view taken orthogonally to an axial direction, showing the conventional tripod type constant velocity universal joint, in which a torque is applied with an operating angle θ between two shafts to be joined. FIG. 10B is an enlarged view of the region of the roller assembly 46 wherein a facet of the outer roller 48 is in contact with the flange portion 52;

FIG. 11 is a schematic cross-sectional view taken along the line X-X of FIG. 9, graphically showing an orbit of a contact point between a facet of the outer roller and a flange portion of the track groove in the conventional tripod type constant velocity universal joint;

FIG. 15A is an enlarged fragmentary cross-sectional view taken orthogonally to an axial direction, showing the tripod type constant velocity universal joint according to the fourth embodiment of the present invention, in which a torque is applied with an operating angle θ between the outer joint member and the inner joint member. FIG. 15B is an enlarged view of a facet 139 of the outer roller 132 is restrained from inclining further with respect to track groove 115;

FIG. 16 is an enlarged fragmentary cross-sectional view showing a tripod type constant velocity universal joint according to a fifth embodiment of the present invention;

FIG. 17A is an enlarged fragmentary cross-sectional view taken along the line W-W of FIG. 14. FIG. 17B is an enlarged view of relief section 125, including a rib 126 formed along a parting line of the forging process, of the spherical portion 124';

FIG. 18 is an enlarged fragmentary cross-sectional view taken orthogonally to an axial direction, showing a tripod type constant velocity universal joint according to a sixth embodiment of the present invention; and FIGS. 19A and 19B are enlarged fragmentary cross-sectional views taken orthogonally to an axial direction, showing a tripod type constant velocity universal joint according to another embodiment of the present invention.

DETAILED DESCRIPTION OF THE PREFERRED EMBODIMENTS

Figure 1:
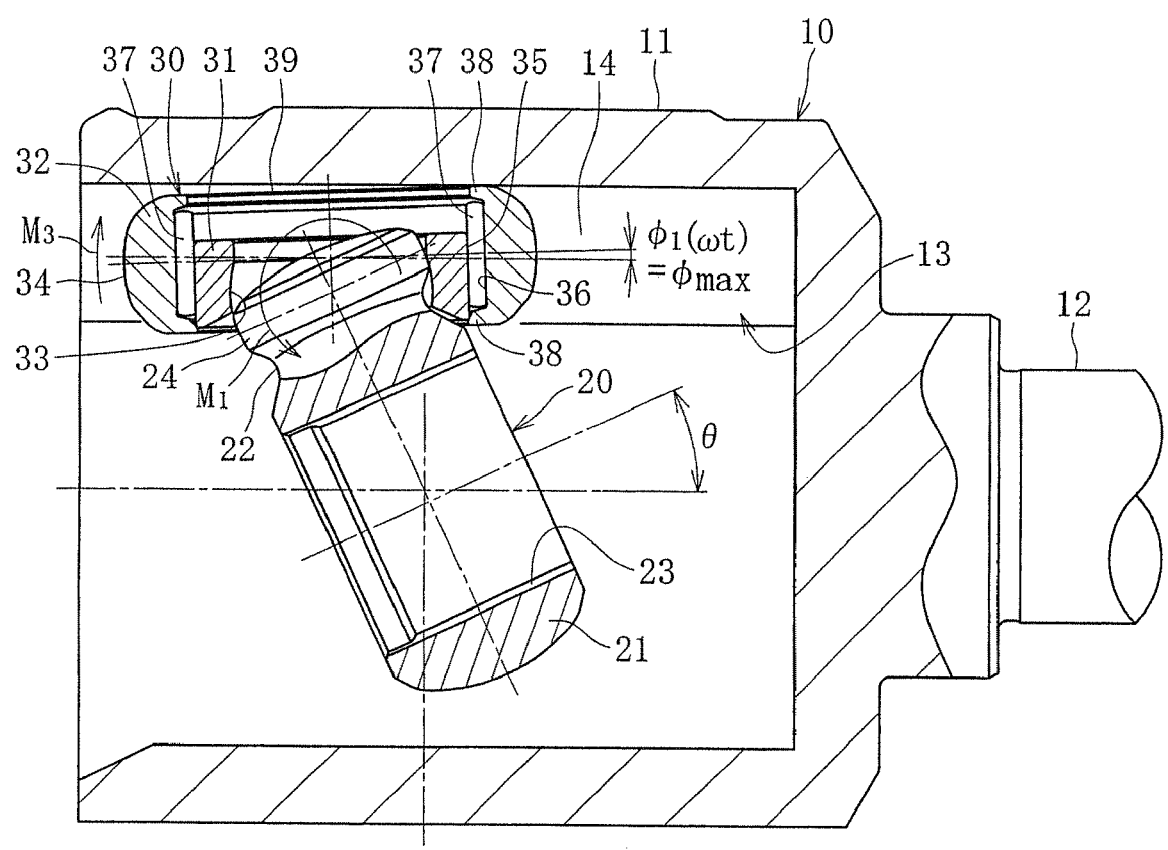
FIG. 1 is an axial cross-sectional view showing a tripod type constant velocity universal joint according to a first embodiment of the present invention, in which a torque is applied with an operating angle θ between the outer joint member and the inner joint member.
Figure 2:
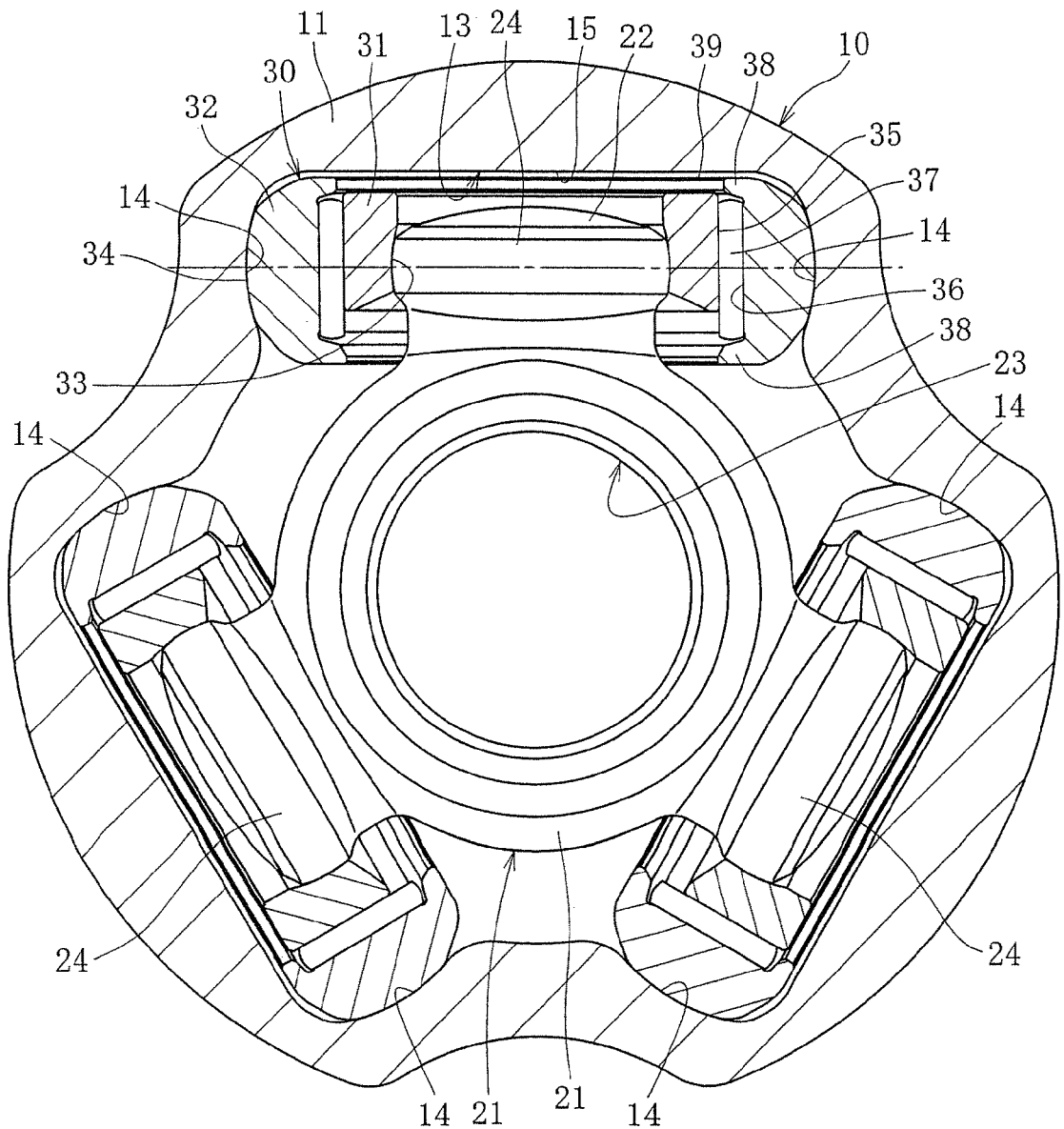
FIG. 2 is a cross-sectional view taken orthogonally to an axial direction, showing the tripod type constant velocity universal joint according to the first embodiment of the present invention, with the outer joint member and the inner joint member axially aligned.

Referring to the accompanying drawings, various embodiments of the present invention will be described hereunder. FIG. 1 is an axial cross-sectional view showing a tripod type constant velocity universal joint according to a first embodiment of the present invention, and FIG. 2 is a cross-sectional view taken orthogonally to the axial direction, showing the same. Firstly based on FIGS. 1 and 2, a basic structure of the tripod type constant velocity universal joint of the first embodiment will be described.

In FIG. 1, the numeral 10 designates an outer joint member, which includes a one-end open cylindrical mouth portion 11 and a stem portion 12 to be connected to one of two shafts to be joined, so as to transmit a torque. On an inner circumferential surface of the mouth portion 11, three axially extending track grooves 13 are provided on positions equally dividing the circumference into three portions. On both sides of the track grooves 13 in a circumferential direction, a pair of roller guide sections 14 is located so as to oppose each other. Each of the roller guide section 14 is a curved recess having a generally arc-shaped cross-section.

In the associated drawings, the numeral 20 designates an inner joint member, including a ring-shaped boss portion 21, three trunnions 22 radially projecting from an outer circumferential surface of the boss portion 21 and circumferentially aligned on positions equally dividing the circumference into three portions, and a serrated hole 23 through which the other of the two shafts to be joined is to be fitted so as to transmit a torque. The trunnion 22 is designed so as to be accommodated in the track groove 13 when the inner joint member 20 is inserted into the outer joint member 10. The trunnion 22 is provided with a spherical portion 24, radially protruding in generally a convex spherical shape along an outer periphery of the trunnion 22.

The numeral 30 designates a roller assembly, to be fitted over the trunnion 22 of the inner joint member 20, thus to be inserted in the track groove 13 of the joint member 10. The roller assembly 30 is of a double-roller type, which includes two rollers namely an inner roller 31 and an outer roller 32.

The inner roller 31 is a circular ring-shaped component having a generally spherically recessed inner circumferential surface 33. The inner circumferential surface 33 of the inner roller 31 has generally the same generatrix curvature radius as that of the spherical portion 24 of the trunnion 22, so as to achieve a spherical fitting when the roller assembly 30 is mounted on the trunnion 22. Such a structure permits the inner roller 31 to pivotally rotate with respect to the trunnion 22.

The outer roller 32 is a circular ring-shaped component having a generally convex arc-shaped outer circumferential surface 34. The outer circumferential surface 34 of the outer roller 32 has generally the same generatrix curvature radius as that of the roller guide section 14, so as to be closely butted to the roller guide section 14 when a torque is applied.

Between a cylindrical outer circumferential surface 35 of the inner roller 31 and a cylindrical inner circumferential surface 36 of the outer roller 32, a plurality of needle rollers 37 is interposed. More specifically, a retainer 38 is provided over an entire circumference along both ends of the cylindrical inner circumferential surface 36 of the outer roller 32, and the needle rollers 37 are accommodated in the retainer 38, reliably and slightly movably in an axial direction. Such arrangement allows relative rotation and relative movement toward the trunnion between the inner roller 31 and the outer roller 32.

That is the basic structure of the tripod type constant velocity universal joint according to the first embodiment, in which, as shown in FIG. 2, the track groove bottom portion 15 opposing a facet 39 of the outer roller 32 is formed in a flat surface communicating between outer end portions in a radial direction of the pair of roller guide sections 14, and the track groove bottom portion 15 is located close to the facet 39 of the outer roller, so that the facet 39 of the outer roller, which is inclined when a torque is applied, can contact the track groove bottom portion 15. When a torque is not applied, the track groove bottom portion 15 and the facet 39 of the outer roller define a predetermined clearance therebetween, as shown in FIG. 2.

The following passage covers an operation of the tripod type constant velocity universal joint according to the first embodiment. Referring to FIG. 1, when a torque is applied with the outer joint member 10 and the inner joint member 20 oriented with an operating angle θ, the trunnion 22 swings along the track groove 13 along with the rotation of the inner joint member 20, and a position of the front end portion of the trunnion 22 is displaced in a radial direction with respect to the outer joint member 10. At this stage, a spin moment $M_1$ that changes an inclination $\phi_1$ ($\omega_t$) of the outer joint member 10 in an axial cross-section as shown in FIG. 1, as well as a spin moment $M_2$ that changes an inclination $\phi_2$ ($\omega_t$) of the outer joint member 10 in a cross-section orthogonal to an axial direction as shown in FIG. 3A, are generated in the roller assembly 30.

The roller assembly 30 is caused to incline by the spin moment $M_1$, $M_2$, and the facet 39 of the outer roller is supported by the track groove bottom portion 15 in contact therewith. The contact angle between the facet 39 of the outer roller and the track groove bottom portion 15 is maintained at a predetermined angle $\phi_{max}$, since the track groove bottom portion 15 is a flat surface opposing the facet 39 of the outer roller. The predetermined angle $\phi_{max}$ is the maximum value of the inclination of the roller assembly 30 $\phi_1$ ($\omega_t$), $\phi_2$ ($\omega_t$), created by the spin moment $M_1$, $M_2$.

Meanwhile, the inclination of the roller assembly 30 $\phi_1$ ($\omega_t$) caused by the spin moment $M_1$ varies within a range defined as $-\phi_{max} \leq \phi_1 (\omega_t) \leq \phi_{max}$, because the trunnion 22 of the inner joint member 20 swings so as to face the opening side and the bottom side of the mouth portion 11 of the outer joint member 10. However, a variation range of the inclination of the roller assembly 30 $\phi_2$ ($\omega_t$) caused by the spin moment $M_2$ differs, as shown in FIG. 3A, depending on a distance and direction in which a line of action of a force $F_2$ applied to the inner roller 31 from the trunnion 22 is offset with respect to a line of action of a force $F_1$ applied to the outer roller 32 from the load side roller guide section 14. In the roller assembly 30 according to the first embodiment, the widthwise center points (center point in a vertical direction in FIG. 2) of the spherical portion 24 of the trunnion 22, the inner roller 31, outer roller 32 and the roller guide section 14 are aligned along the dash-dotted line in FIG. 2, when the operating angle is zero and a torque is not applied. Therefore, when a torque is applied under an operating angle θ, the line of action of the force $F_2$ is offset to an inner side of the outer joint member 10 in a radial direction, with respect to the line of action of the force $F_1$, as shown in FIG. 3A.

The spin moments $M_1$, $M_2$ are simultaneously generated when a torque is applied to the joint, and the respective magnitude changes with time according to the rotation phase angle of the inner joint member 20. This causes the contact point between the track groove bottom portion 15 and the facet 39 of the outer roller to move along the semi-arc C shown in solid line in FIG. 4. More specifically, when the magnitude of the spin moment $M_1$, $M_2$ changes, the center $l_m$ of moment causing the roller assembly 30 to incline with respect to the track groove bottom portion 15 rotates about the normal passing the center O of the arc C as shown in FIG. 4, by which the contact point between the track groove bottom portion 15 and the facet 39 of the outer roller reciprocates along the semi-arc C. Accordingly, the distance between contact point and center L from the contact point between the track groove bottom portion 15 and the facet 39 of the outer roller ($A_1$, $A_2$, $A_3$, $B_1$, $B_3$ etc.) to the center of moment $l_m$ is maintained constant (the radius of the arc C). Maintaining thus the distance between contact point and center L at a constant value allows maintaining the inclination of the roller assembly 30 with respect to the track groove bottom portion 15 irrespective of a rotation phase angle of the inner joint member 20, thereby preventing generation of an excessive frictional force between the facet 39 of the outer roller and the track groove bottom portion 15.

Restraining as above the rolling resistance of the outer roller 32 against the non-load side roller guide section 14, as well as the frictional force between the outer roller 32 and the track groove bottom portion 15, results in reduction of the tertiary rotational axial force, and hence in improvement in rotating durability of the joint.

Figure 5:
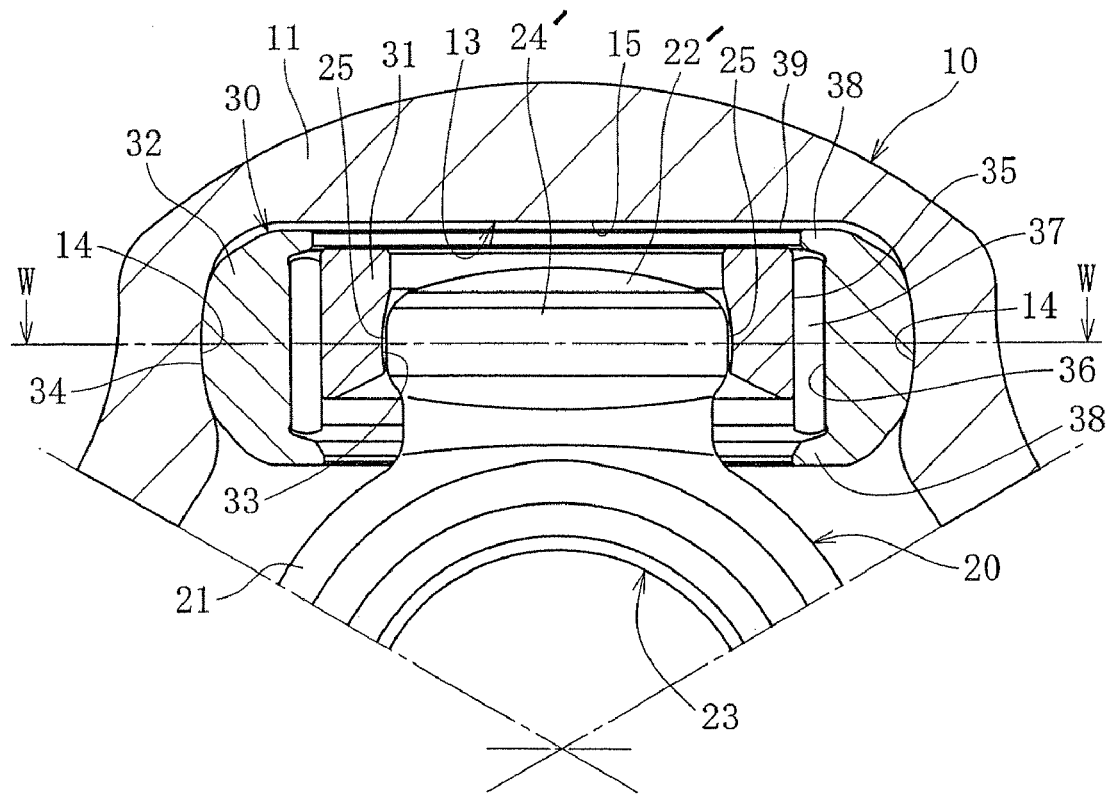
FIG. 5 is an enlarged fragmentary cross-sectional view showing a tripod type constant velocity universal joint according to a second embodiment of the present invention.

Now referring to FIGS. 5, 6A and 6B, a tripod type constant velocity universal joint according to a second embodiment of the present invention will be described hereunder. The tripod type constant velocity universal joint according to the second embodiment is different from the first embodiment in that, as shown in FIG. 5, a relief section 25 having a smaller diameter than the inner circumferential surface 33 of the inner roller is provided on a torque applying region of the trunnion 22' of the inner joint member 20. Since the remaining portions of the structure are similar to the first embodiment, the following passage primarily refers to this difference.

The relief section 25 corresponds, as shown in FIG. 5, to a torque applying region of the trunnion 22' of the inner joint member 20, but formed partially in a smaller diameter than the inner circumferential surface 33 of the inner roller. In this embodiment, the torque applying region stands for the spherical portion 24'. While the spherical portion 24' is intended for spherically fitting with the inner circumferential surface 33 of the inner roller, providing the relief section 25 in a portion of the spherical portion 24' serves to reduce an interference margin when mounting the inner roller 31 on the trunnion 22', thus to reduce or eliminate an elastic deformation of the inner roller 31.

Figure 6A:
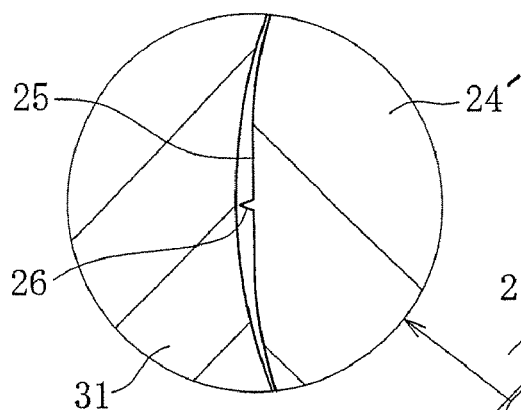
FIG. 6A includes an enlarged fragmentary cross-sectional view taken along the line W-W of FIG. 5.

Referring to FIG. 6A, the relief section 25 is located in a region including a rib 26 formed along a parting line of the forging process of the spherical portion 24'. Providing the relief section 25 along the forging parting line on the spherical portion 24' makes the rib 26 protrude from a position farther inside from the inner circumferential surface 33 of the inner roller. Positioning thus the rib 26 so as not to reach the inner circumferential surface 33 of inner roller eliminates the need to remove the rib 26, which permits assembling the cold-forged trunnions without any further finishing, thereby reducing the manufacturing cost.

Figure 6B:
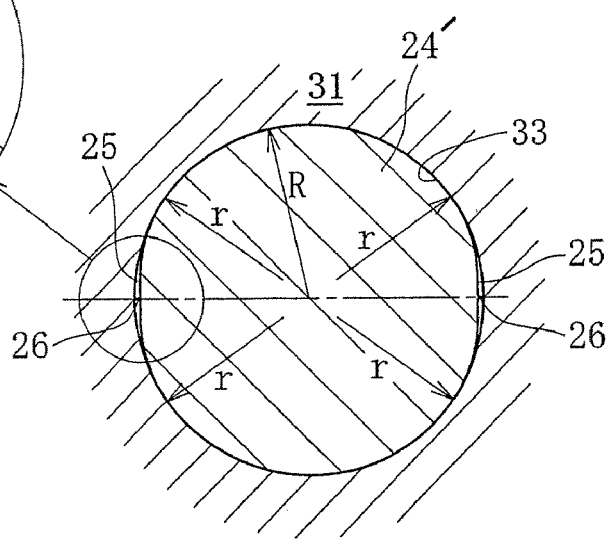
FIG. 6B is an enlarged view of relief section 25, including a rib 26 formed along a parting line of the forging process, of the spherical portion 24'.

The relief section 25 may be formed in various shapes, among which a preferable way is, as shown in FIG. 6B, to form the trunnion such that an orthogonally taken cross-sectional shape includes a dual spherical portion. More specifically, it is preferable to set a radius r of the dual spherical portion of the relief section 25 in a range of R/2<r<R, where R designates a curvature radius of the inner circumferential surface 33 of the inner roller. In this case, the contact point between the spherical portion 24' and the inner roller 31 is located at two points symmetrically positioned with respect to the parting line of the trunnion 22'. When a torque is applied and thereby the spherical portion 24' and/or the inner roller 31 incurs an elastic deformation, the contact interface between the spherical portion 24' and the inner roller 31 (a generally elliptical region) continuously moves along the relief section 25. Consequently, a stress can be kept from concentrating in the edge of the relief section 25, which results in improved durability of the trunnion 22'.

On the other hand, as a result of providing the relief section 25 in the spherical portion 24', the spherical portion 24' and the inner roller 31 contact each other via two points symmetrically located with respect to the rib 26, which incurs an increase in frictional force between the spherical portion 24' and the inner roller 31. Such increase in frictional force leads to an increase in spin moment $M_1$ which causes the roller assembly 30 to incline. However, despite the increase in spin moment $M_1$, the inclination of the roller assembly 30 with respect to the track groove bottom portion 15 is maintained substantially constant irrespective of a rotation phase angle of the inner joint member 20. Consequently, the frictional force generated in the joint is stabilized, and hence suppressed from excessively increasing, irrespective of the changes of the rotation phase angle of the inner joint member 20.

Figure 7:
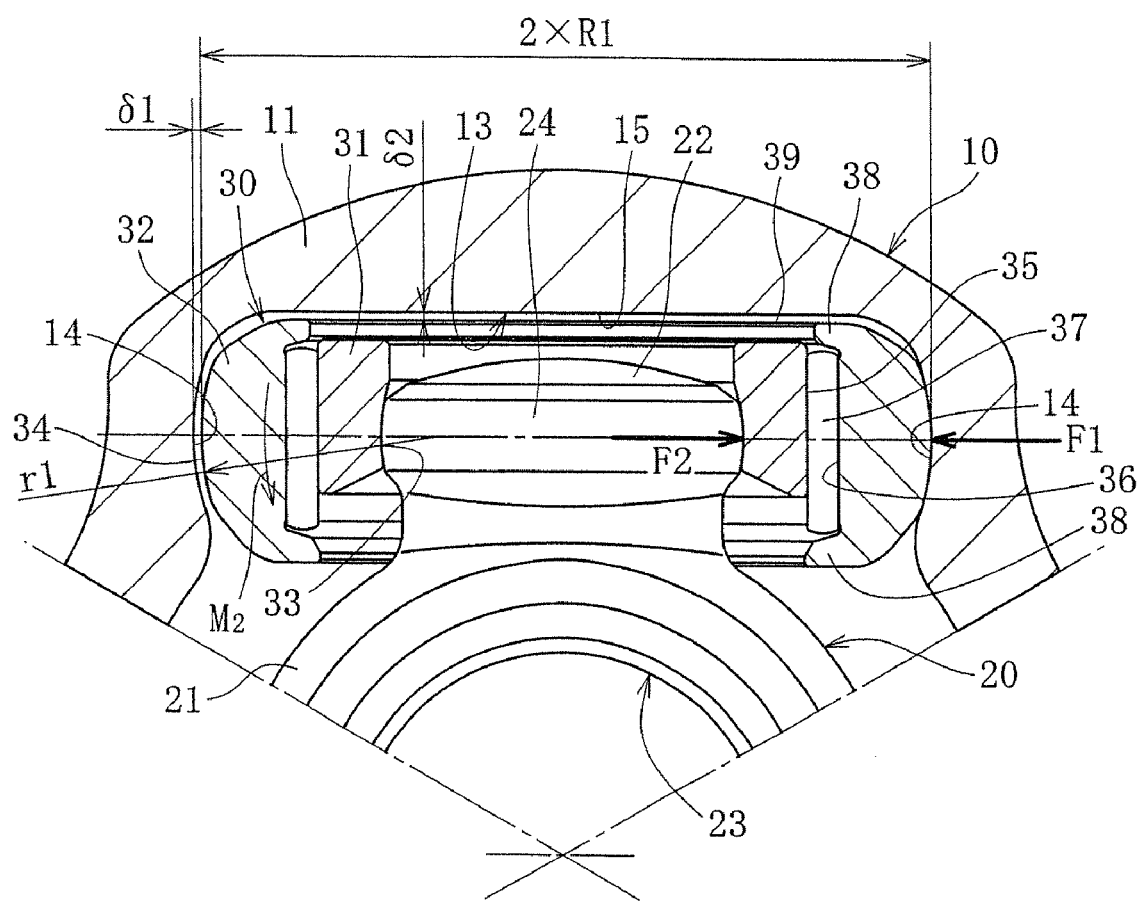
FIG. 7 is an enlarged fragmentary cross-sectional view showing a tripod type constant velocity universal joint according to a third embodiment of the present invention.
Figure 8:
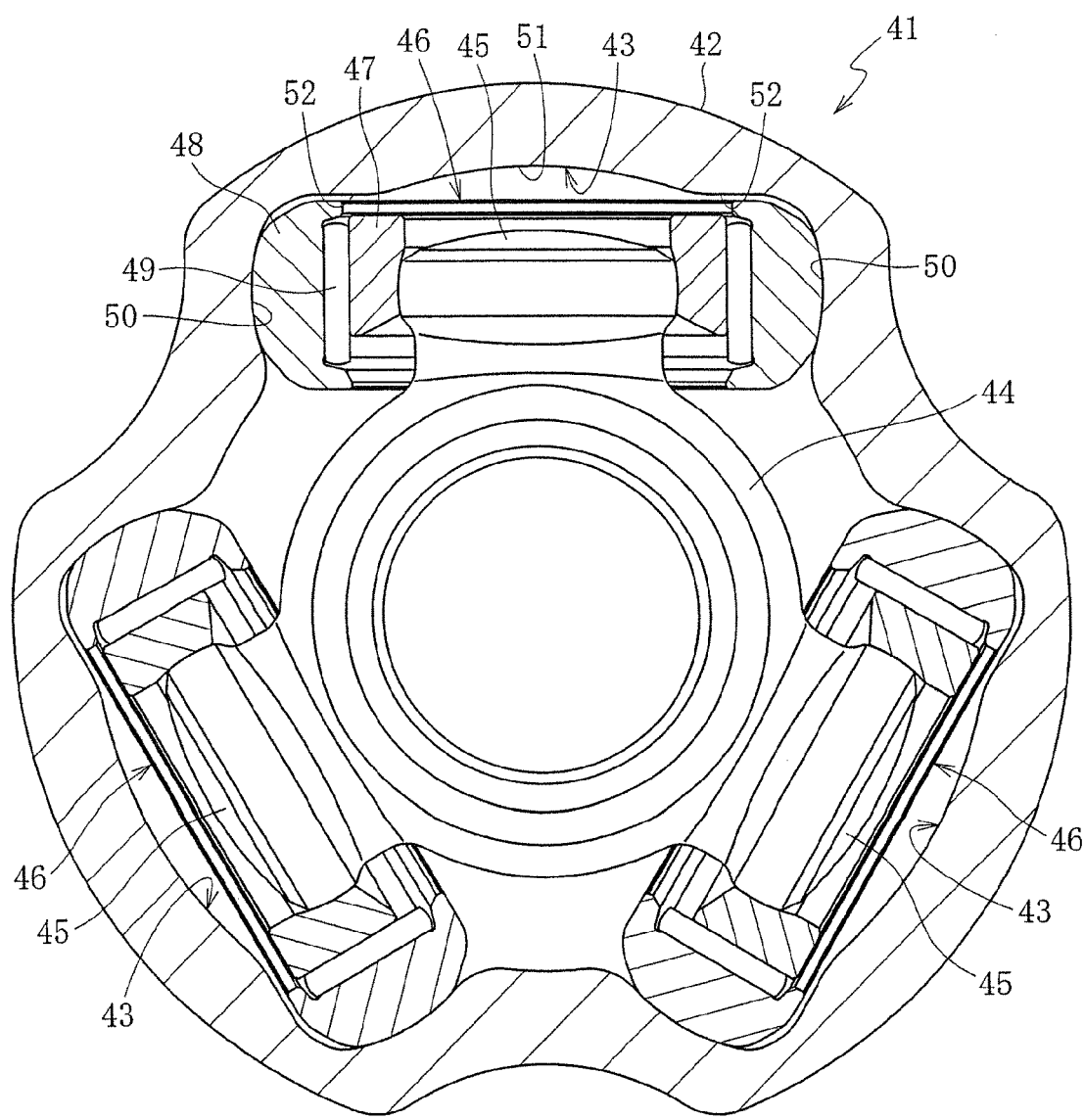
FIG. 8 is a cross-sectional view taken orthogonally to an axial direction, showing a conventional tripod type constant velocity universal joint.
Figure 9:
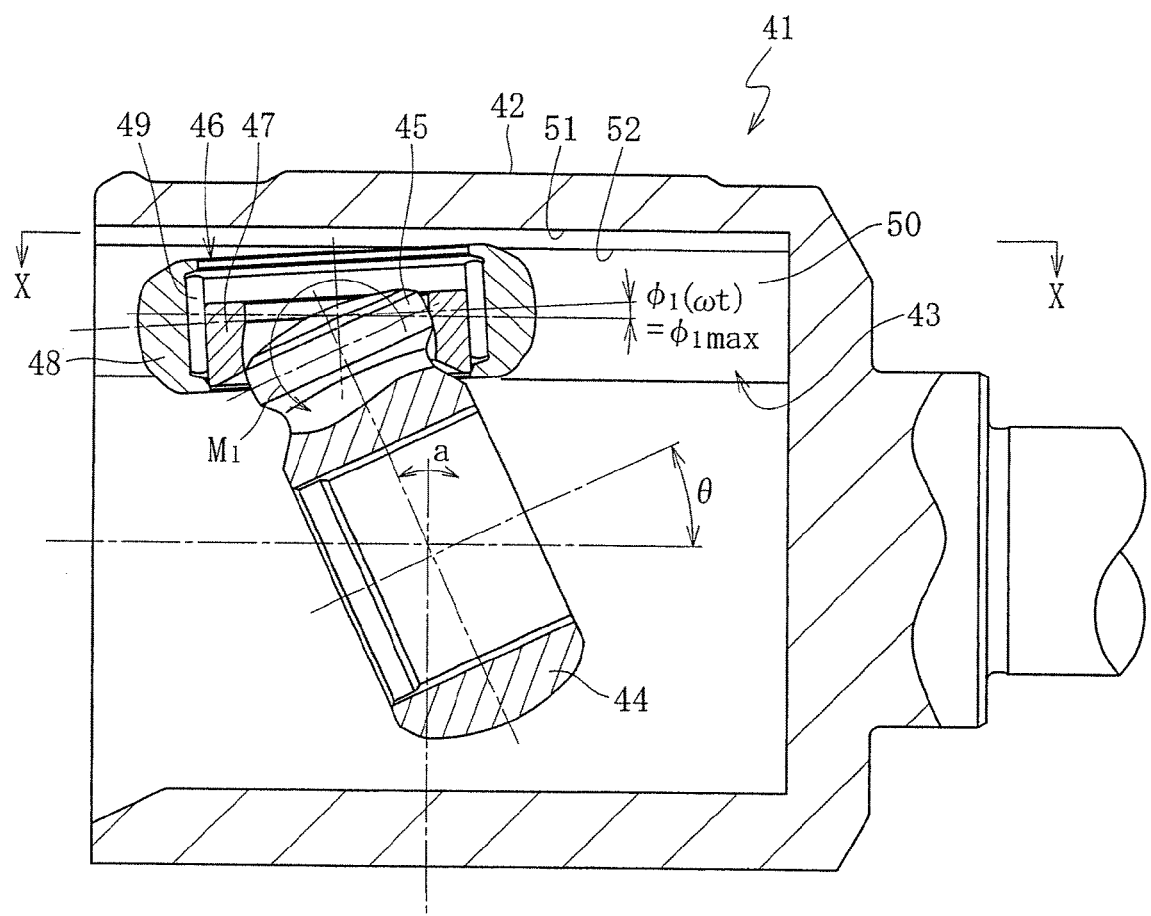
FIG. 9 is an axial cross-sectional view showing the conventional tripod type constant velocity universal joint, in which a torque is applied with an operating angle θ between two shafts to be joined.

Referring now to FIG. 7, a tripod type constant velocity universal joint according to a third embodiment of the present invention will be described. In the tripod type constant velocity universal joint according to the third embodiment, as shown in FIG. 7, the outer circumferential surface 34 of the outer roller and the roller guide section 14 are formed so as to define therebetween a clearance $\delta_1$ (mm) wider than 0.03/A when a torque is applied, and the facet 39 of the outer roller and the track groove bottom portion 15 are formed so as to define therebetween a clearance $\delta_2$ (mm) wider than 0.15×A, wherein $A=r_1/R_1$; $r_1$ is the generatrix curvature radius of the outer circumferential surface 34 of the outer roller; and $R_1$ is the outer radius of the outer roller 32. In the third embodiment, the tripod type constant velocity universal joint of the first embodiment is referred to for applying the clearances $\delta_1$, $\delta_2$, however it is a matter of course that such configuration is also applicable to the tripod type constant velocity universal joint of the second embodiment.

For the tripod type constant velocity universal joint according to the third embodiment, a relation between an annularity A ($=r_1/R_1$) represented by a ratio of the generatrix curvature radius with respect to the outer radius $R_1$ of the outer roller 32 and various inclinations of the outer roller 32 inside the track groove 13 has been focused, so as to determine the clearance $\delta_1$ between the outer circumferential surface 34 of the outer roller and the non-load side roller guide section 14, as well as the clearance $\delta_2$ between the facet 39 of the outer roller and the track groove bottom portion 15. Specifically, when the annularity A is smaller, the outer roller 32 is inclined by a greater angle in a cross-section perpendicular to an axial line of the outer joint member 10, and the outer circumferential surface 34 of the outer roller and the non-load side roller guide section 14 more readily contact each other, while in a cross-section including an axial line of the outer joint member 10, a restoring couple $M_3$ (Ref. FIG. 1) acting opposite to the spin moment $M_1$ becomes apt to be generated, which impedes the facet 39 of the outer roller from contacting the track groove bottom portion 15. On the contrary, when the annularity A is greater, the outer roller 32 is inclined in a greater angle in a cross-section including an axial line of the outer joint member 10 and the facet 39 of the outer roller and the track groove bottom portion 15 more readily contact each other, while in a cross-section perpendicular to an axial line of outer joint member 10, the inclination by the spin moment $M_2$ is suppressed, and the outer circumferential surface 34 of the outer roller and the non-load side roller guide section 14 are impeded from contacting each other.

Based on such findings, the clearance $\delta_1$ produced between the outer circumferential surface 34 of the outer roller and the non-load side roller guide section 14 when a torque is applied is set to be wider than 0.03/A in this embodiment, in other words the clearance $\delta_1$ is set to be inversely proportional to the annularity A. As a result, the outer circumferential surface 34 of the outer roller and the non-load side roller guide section 14 are inhibited from contacting each other, to a maximal extent or completely, despite a variation of the annularity A of the outer roller 32, and therefore generation of the frictional force inside the joint is suppressed.

Also, in this embodiment, the clearance $\delta_2$ produced between the facet 39 of the outer roller and the track groove bottom portion 15 is set to be wider than 0.15×A, i.e. proportional to the annularity A. As a result, a contacting force between the facet 39 of the outer roller and the track groove bottom portion 15 is alleviated despite a variation of the annularity A of the outer roller 32, and therefore generation of the frictional force inside the joint is suppressed.

Setting thus the clearances $\delta_1$, $\delta_2$ appropriately according to the annularity A of the outer roller 32 allows further reducing the tertiary rotational axial force, thereby further improving the shudder suppressing effect and rotating durability. In addition, it is preferable to set the annularity A of the outer roller 32 in a range of $0.475 \leq A < 1$.

In the foregoing embodiments, the roller guide section 14 and the outer circumferential surface 34 of the outer roller are given a generally the same generatrix curvature radius so as to closely contact each other, however the roller guide section 14 may be formed in a gothic arch shape, so as to achieve an angular contact between the outer circumferential surface 34 of the outer roller and the roller guide section 14.

Also, while the retainer 38 that retains the needle rollers 37 is integrally formed with the outer roller 32 in the foregoing embodiments, the retainer 38 may be separately fabricated and then attached to the outer roller 32. Further, the retainer 38 may be provided on the inner roller 31 instead of the outer roller 32.

Figure 12:
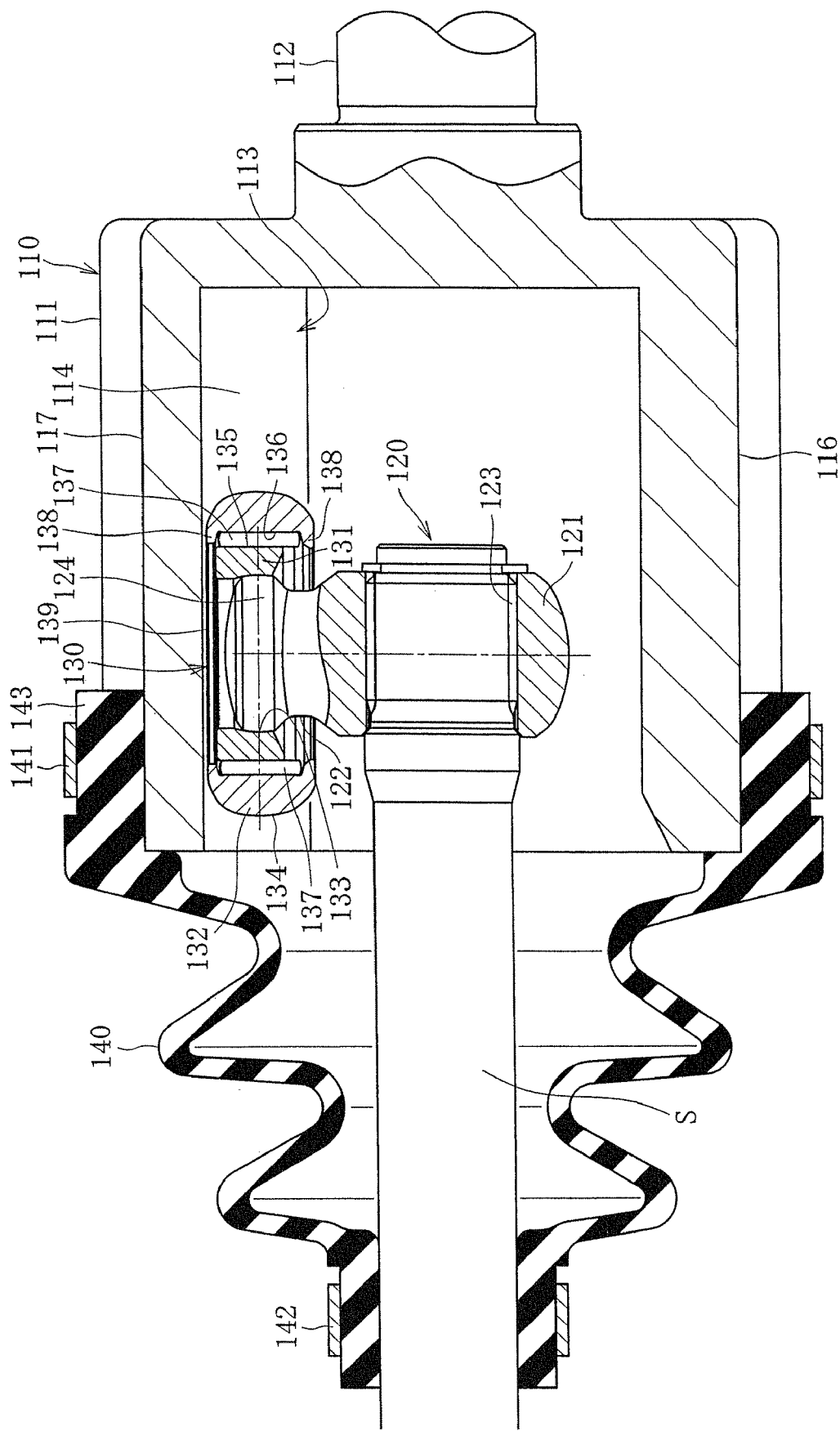
FIG. 12 is an axial cross-sectional view showing a tripod type constant velocity universal joint with a boot having improved retention capability according to a fourth embodiment of the present invention, with the outer joint member and the inner joint member axially aligned.
Figure 13:
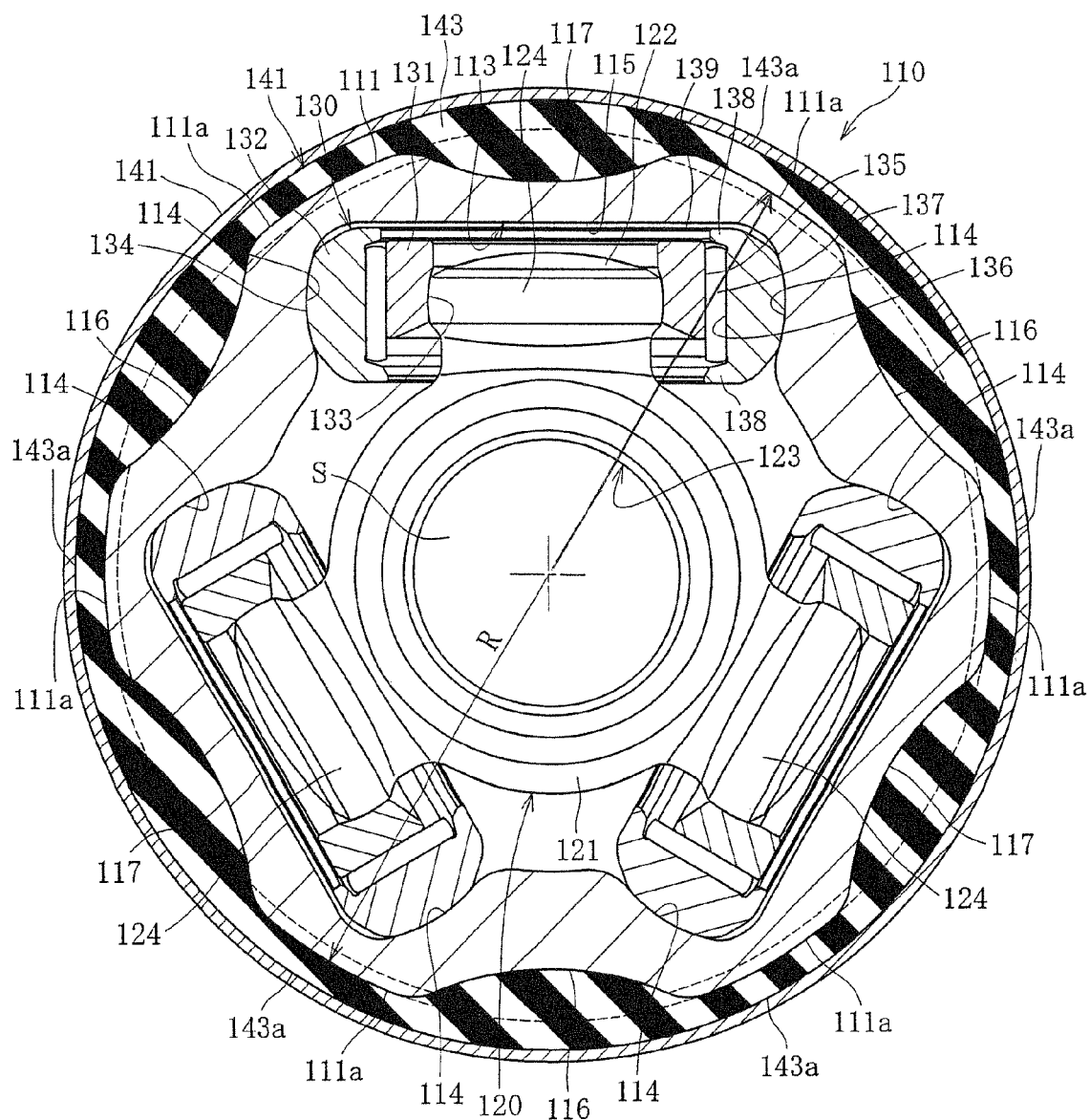
FIG. 13 is a cross-sectional view taken orthogonally to an axial direction, showing the tripod type constant velocity universal joint according to the fourth embodiment of the present invention, with the outer joint member and the inner joint member axially aligned.

The following passages describe three, namely a fourth to sixth embodiments, in which a boot provided with an enhanced retention capability is incorporated. FIG. 12 is an axial cross-sectional view showing a tripod type constant velocity universal joint according to a fourth embodiment, and FIG. 13 is a cross-sectional view taken orthogonally to an axial direction, showing the same.

In FIG. 12, the numeral 110 designates an outer joint member, which includes a one-end open cylindrical mouth portion 111 and a stem portion 112 to be connected to one of two shafts to be joined (not shown), so as to transmit a torque. On an inner circumferential surface of the mouth portion 111, three axially extending track grooves 113 are provided on positions equally dividing the circumference into three portions, as shown in FIG. 13. On both sides of the track grooves 113 in a circumferential direction, a pair of roller guide sections 114 is located so as to oppose each other. Each of the roller guide section 114 is a curved recess having a generally arc-shaped cross-section. The track groove bottom portion 115 is formed in a flat surface communicating between outer end portions in a radial direction of the pair of roller guide sections 114. The outer joint member 110 includes a first reduced-thickness portion 116 having a smaller diameter than a maximum rotation diameter R of the outer joint member 110, on an outer periphery thereof in a region corresponding to the region between the track grooves 113. The first reduced-thickness portion 116 is a groove having a curved cross-section and extending along an axial direction of the outer joint member 110, and located on positions equally dividing the circumference of the outer joint member 110 into three portions. Also, the outer joint member 110 includes a second reduced-thickness portion 117, having a smaller diameter than a maximum rotation diameter R of the outer joint member 110, on an outer periphery thereof in a region corresponding to the region where the track grooves 113 are located. The second reduced-thickness portion 117 has generally the same cross-sectional shape taken orthogonally to an axial line of the outer joint member 110, as that of the first reduced-thickness portion 116. Also, the second reduced-thickness portion 117 is located in a central portion of the region between the adjacent first reduced-thickness portions 116. Accordingly, the outer joint member 110 according to the fourth embodiment is provided with three each of the first and the second reduced-thickness portions 116, 117 of a groove shape, axially extending and alternately aligned in a circumferential direction at positions equally dividing the circumference into six portions, by which reduction in weight of the outer joint member 110 is achieved.

In the associated drawings, the numeral 120 designates an inner joint member, including a ring-shaped boss portion 121, three trunnions 122 radially projecting from an outer circumferential surface of the boss portion 121 and circumferentially aligned on positions equally dividing the circumference into three portions, and a serrated hole 123 through which the other shaft S of the two shafts to De joined is to be fitted so as to transmit a torque. The trunnion 122 is designed so as to be accommodated in the track groove 113 when the inner joint member 120 is inserted into the outer joint member 110. The trunnion 122 is provided with a spherical portion 124, radially protruding in generally a convex spherical shape along an outer periphery of the trunnion 122.

The numeral 130 designates a roller assembly, to be pivotally fitted over the trunnion 122, thus to be rotatably inserted in the roller guide section 114 of the outer joint member 110. The roller assembly 130 is of a double-roller type, which includes two rollers namely an inner roller 131 and an outer roller 132.

The inner roller 131 is a circular ring-shaped component having a generally spherically recessed inner circumferential surface 133. The inner circumferential surface 133 of the inner roller 131 has generally the same generatrix curvature radius as that of the spherical portion 124 of the trunnion 122, so as to achieve a spherical fitting when the roller assembly 130 is mounted on the trunnion 122, Such a structure permits the inner roller 131 to pivotally rotate with respect to the trunnion 122.

The outer roller 132 is a circular ring-shaped component having a generally convex arc-shaped outer circumferential surface 134. The outer circumferential surface 134 of the outer roller 132 has generally the same generatrix curvature radius as that of the roller guide section 114, so as to be closely butted to the roller guide section 114 when a torque is applied.

Between a cylindrical outer circumferential surface 135 of the inner roller 131 and a cylindrical inner circumferential surface 136 of the outer roller 132, a plurality of needle rollers 137 is interposed. More specifically, a retainer 138 is provided over an entire circumference along both ends of the cylindrical inner circumferential surface 136 of the outer roller 132, and the needle rollers 137 are accommodated in the retainer 138, reliably and slightly movably in an axial direction. Such arrangement allows relative rotation and relative movement toward the trunnion between the inner roller 131 and the outer roller 132.

In the associated drawings, the numeral 140 designates a boot, which is fitted to the mouth portion 111 of the outer joint member 110 at an end portion and to a shaft S extended from the inner joint member 120 at the other end portion, so as to seal an inner region of the joint. The boot 140 is a bellows-shaped component made of an elastic material such as a rubber or a synthetic resin, and has the end portions fastened with a boot strap 141, 142. The fitting portion 143 of the boot 140 to be engaged with the outer joint member 110 has generally the same inner circumferential profile as the outer circumferential profile of the outer joint member 110.

In the tripod type constant velocity universal joint according to the fourth embodiment as stated above, the track groove bottom portion 115 is formed in a flat surface communicating between outer end portions in a radial direction of the pair of roller guide sections 114, and located close to a facet 139 of the outer roller 132 accommodated in the roller guide section 114. Accordingly, a difference between the inner diameter of the central portion of the track groove bottom portion 115 and a maximum rotating diameter R of the outer joint member 110 becomes greater than a difference between the inner diameter of the end portions of the track groove bottom portion 115 and a maximum rotating diameter R of the outer joint member 110. Such a configuration allows securing a space for locating the second reduced-thickness portion 117 of a groove shape on the outer periphery of the outer joint member 110, in a region corresponding to where the track groove 113 are provided, thus reducing the weight of the outer joint member 110.

Also, forming the first reduced-thickness portion 116 and the second reduced-thickness portion 117 in a groove shape allows achieving a desired reduction in thickness, while securing a sufficient circumferential length of the maximum rotating diameter portion 111a of the outer joint member 110. A mechanism that prevents axial position shift of the fitting portion between the outer joint member 110 and the boot 140 can only be provided on the maximum rotating diameter portion 111a of the outer joint member 110, from the viewpoint of reducing the manufacturing cost. Still, the retention capability of the boot 140 can be improved, since a sufficient circumferential length of the maximum rotating diameter portion can be secured.

Further, providing the first reduced-thickness portion 116 and the second reduced-thickness portion 117 so as to be alternately aligned in a circumferential direction on positions equally dividing the circumference of the outer joint member 110 into six portions grants a symmetric profile to the outer joint member 110, which serves to stabilize the rotation of the tripod type constant velocity universal joint.

Further, forming the first reduced-thickness portion 116 and the second reduced-thickness portion 117 in generally the same cross-sectional shape taken orthogonally to an axial line of the outer joint member 110 leads to higher work efficiency in fitting the boot 140 to the outer joint member 110. More specifically, simply positioning one of the maximum rotating diameter portions 111a of the outer joint member 110 so as to match one of the maximum inner diameter portions 143a of the boot 140 achieves correctly fitting the boot 140 to the outer joint member 110, eliminating an operational error.

Figure 14:
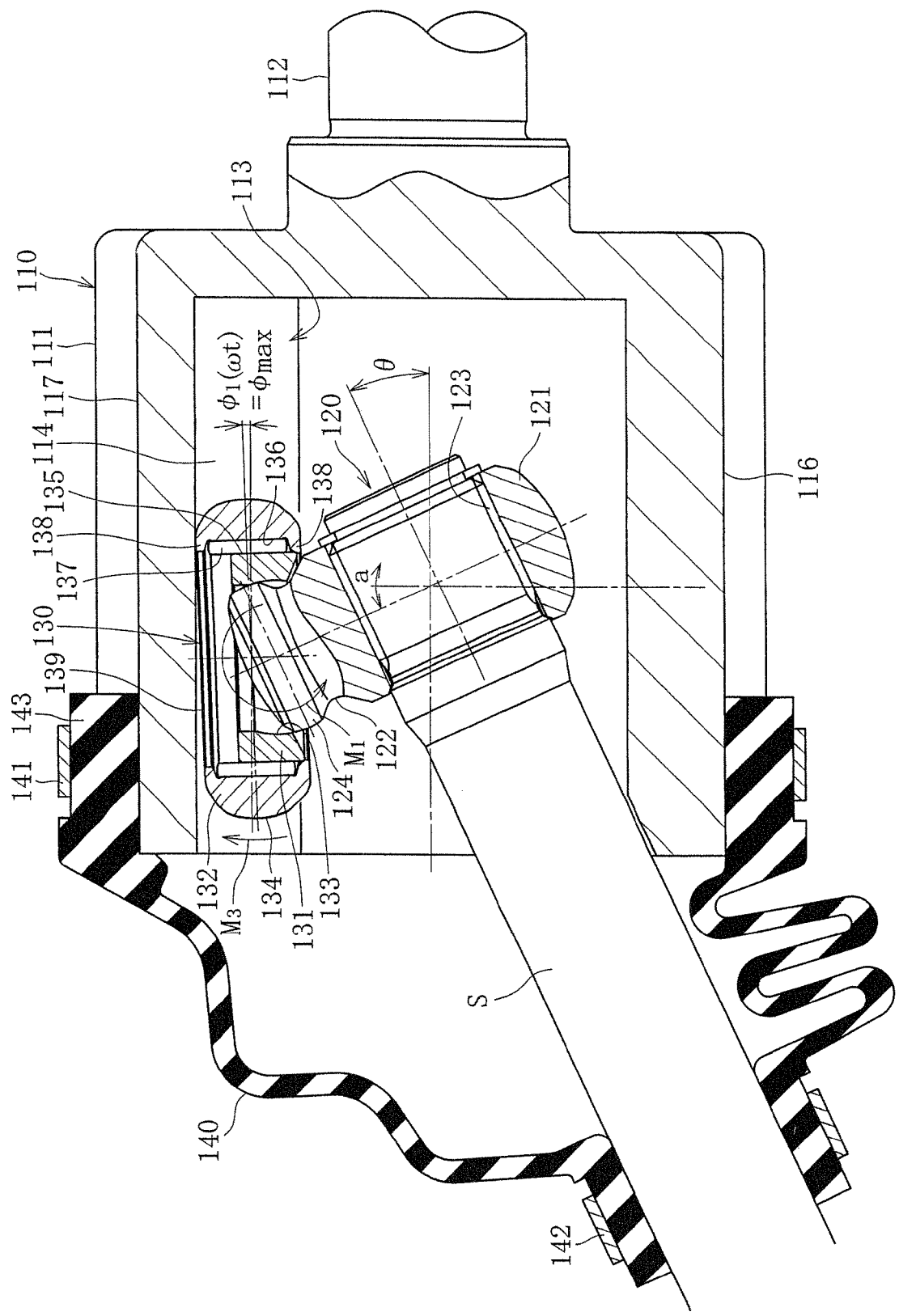
FIG. 14 is an enlarged fragmentary axial cross-sectional view showing the tripod type constant velocity universal joint according to the fourth embodiment of the present invention, in which a torque is applied with an operating angle θ between the outer joint member and the inner joint member.

Referring to FIG. 14, in the foregoing tripod type constant velocity universal joint, when a torque is applied at an operating angle θ, i.e. when an axial line of the outer joint member 110 and an axial line of the inner joint member 120 are inclined by the angle θ, the trunnions 122 swing along the respective mating track grooves 113 as indicated by the arrow a in FIG. 14, along with the rotation of the inner joint member 120. At this stage, the outer roller 132 is pressed against the load side roller guide section 114 by the trunnion 122, and reciprocates along the track groove 113 rolling on the load side roller guide section 114.

When the trunnion 122 swings along the track groove 113, the inner roller 131 pivotally rotates with respect to the trunnion 122, thereby generating a frictional force against the trunnion 122. The frictional force is transmitted to the outer roller 132 via the inner roller 131, by which a spin moment $M_1$ is generated so as to change an inclination $\phi_1 (\omega_t)$ of the outer roller 132 in an axial cross-section of the outer joint member 110.

The swinging motion of the trunnion 122 along the track groove 113 also displaces a position of the front end portion of the trunnion 122 in a radial direction with respect to the outer joint member 110. At this moment, as shown in FIG. 15A, a line of action of a force $F_2$ loaded on the inner roller 131 from the trunnion 122 is offset with respect to a line of action of a force $F_1$ loaded on the outer roller 132 from the load side roller guide section 114, which generates a spin moment $M_2$ so as to change an inclination $\phi_2 (\omega_t)$ of the outer roller 132 in a cross-section orthogonal to an axial line of the outer joint member 110.

Normally the spin moments $M_1$, $M_2$ are simultaneously generated, and the inclinations $\phi_1 (\omega_t)$, $\phi_2 (\omega_t)$ of the outer roller 132 change with time depending on the environment of use and the rotation phase angle of the inner joint member 120. However, in the case of transmitting a relatively great torque such as in a driving system of an automobile, the spin moments $M_1$ and $M_2$ cause the outer roller 132 to incline by a larger angle.

When the outer roller 132 is largely inclined, the outer roller 132 comes in contact with the non-load side roller guide section 114, thus increasing the rolling resistance of the outer roller 132. This incurs an excessive frictional force inside the joint, which leads to an increase in tertiary rotational axial force. Such axial force often provokes vibration called "shudder" of the vehicle in which the tripod type constant velocity universal joint is incorporated.

In the foregoing tripod type constant velocity universal joint, the track groove bottom portion 115 is formed in a flat surface communicating between the end portions of the pair of roller guide sections 114, and located close to a facet 139 of the outer roller 132 accommodated in the roller guide section 114. Accordingly, even though the outer roller 132 becomes inclined with respect to the track groove bottom portion 115 when a torque is applied, the facet 139 of the outer roller is sustained by the track groove bottom portion 115, and thereby the outer roller 132 is restrained from inclining further with respect to the track groove bottom portion 115. This keeps the outer roller 132 and the non-load side roller guide section 114 from contacting each other, thus minimizing the rolling resistance of the outer roller 132. Consequently, generation of the frictional force inside the joint can be suppressed, and the tertiary rotational axial force can be reduced.

Now referring to FIGS. 16, 17A and 17B, a tripod type constant velocity universal joint according to a fifth embodiment of the present invention will be described hereunder. The tripod type constant velocity universal joint according to the fifth embodiment is different from the fourth embodiment in that, as shown in FIG. 16, a relief section 125 having a smaller diameter than the inner circumferential surface 133 of the inner roller 131 is provided on a torque applying region of the trunnion 122' of the inner joint member 120. Since the remaining portions of the structure are similar to the fourth embodiment, the following passage primarily refers to this difference.

The relief section 125 corresponds, as shown in FIG. 16, to a torque applying region of the trunnion 122' of the inner joint member 120, but formed partially in a smaller diameter than the inner circumferential surface 133 of the inner roller. In this embodiment, the torque applying region stands for the spherical portion 124'. while the spherical portion 124' is intended for spherically fitting with the inner circumferential surface 133 of the inner roller, providing the relief section 125 in a portion of the spherical portion 124' serves to reduce an interference margin when mounting the inner roller 131 on the trunnion 122', thus to reduce or eliminate an elastic deformation of the inner roller 131.

Referring to FIGS. 17A and 17B, the relief section 125 is located in a region Including a rib 126 formed along a parting line of the forging process of the spherical portion 124'. Providing the relief section 125 along the forging parting line on the spherical portion 124' makes the rib 126 protrude from a position farther inside from the inner circumferential surface 133 of the inner roller. Positioning thus the rib 126 so as not to reach the inner circumferential surface 133 of the inner roller eliminates the need to remove the rib 126, which permits assembling the cold-forged trunnions without any further finishing, thereby reducing the manufacturing cost.

The relief section 125 may be formed in various shapes, among which a preferable way is, as shown in FIG. 17B, to form the trunnion such that an orthogonally taken cross-sectional shape includes a dual spherical portion. More specifically, it is preferable to set a radius $r_0$ of the dual spherical portion of the relief section 125 in a range of $R_0/2 < r_0 < R_0$, where $R_0$ designates a curvature radius of the inner circumferential surface 133 of the inner roller. In this case, the contact point between the spherical portion 124 and the inner roller 131 is located at two points symmetrically positioned with respect to the parting line of the trunnion 122'. When a torque is applied and thereby the spherical portion 124' and/or the inner roller 131 incurs an elastic deformation, the contact interface between the spherical portion 124' and the inner roller 131 (a generally elliptical region) continuously moves along the relief section 125. Consequently, a stress can be kept from concentrating in the edge of the relief section 125, which results in improved durability of the trunnion 122'.

On the other hand, as a result of providing the relief section 125 in the spherical portion 124', the spherical portion 124' and the inner roller 131 contact each other via two points symmetrically located with respect to the rib 126, which increases the frictional force between the spherical portion 124' and the inner roller 131. Such increase in frictional force leads to an increase in spin moment $M_1$ which causes the roller assembly 130 to incline. However, despite the increase in spin moment $M_1$, the inclination of the roller assembly 130 with respect to the track groove bottom portion 115 is maintained substantially constant irrespective of a rotation phase angle of the inner joint member 120. Consequently, the frictional force generated inside the joint is stabilized, and hence suppressed from excessively increasing, irrespective of the changes of the rotation phase angle of the inner joint member 120.

Referring now to FIG. 18, a tripod type constant velocity universal joint according to a sixth embodiment of the present invention will be described. In the tripod type constant velocity universal joint according to the sixth embodiment, as shown in FIG. 18, the outer circumferential surface 134 of the outer roller and the roller guide section 114 are formed so as to define therebetween a clearance $\delta_1$ (mm) wider than 0.03/A when a torque is applied, and the facet 139 of the outer roller and the track groove bottom portion 115 are formed so as to define therebetween a clearance $\delta_2$ (mm) wider than 0.15×A, wherein $A = r_1/R_1$; $r_1$ is the generatrix curvature radius of the outer circumferential surface 134 of the outer roller; and $R_1$ is the outer radius of the outer roller 132. In the sixth embodiment, the tripod type constant velocity universal joint of the fourth embodiment is referred to for applying the clearances $\delta_1$, $\delta_2$, however it is a matter of course that such configuration is also applicable to the tripod type constant velocity universal joint of the fifth embodiment.

For the tripod type constant velocity universal joint according to the sixth embodiment, a relation between an annularity $A$ ($=r_1/R_1$) represented by a ratio of the generatrix curvature radius $r_1$ with respect to the outer radius $R_1$ of the outer roller 132 and various inclinations of the outer roller 132 inside the track groove 113 has been focused, so as to determine the clearance $\delta_1$ between the outer circumferential surface 134 of the outer roller and the non-load side roller guide section 114, as well as the clearance $\delta_2$ between the facet 139 of the outer roller and the track groove bottom portion 115. Specifically, when the annularity A is smaller, the outer roller 132 is inclined by a greater angle in a cross-section perpendicular to an axial line of the outer joint member 110, and the outer circumferential surface 134 of the outer roller and the non-load side roller guide section 114 more readily contact each other, while in a cross-section including an axial line of the outer joint member 110, a restoring couple $M_3$ (Ref. FIG. 14) acting opposite to the spin moment $M_1$ becomes apt to be generated, which impedes the facet 139 of the outer roller from contacting the track groove bottom portion 115. On the contrary, when the annularity A is greater, the outer roller 132 is inclined by a greater angle in a cross-section including an axial line of the outer joint member 110 and the facet 139 of the outer roller and the track groove bottom portion 115 more readily contact each other, while in a cross-section perpendicular to an axial line of the outer joint member 110, the inclination by the spin moment $M_2$ is suppressed, and the outer circumferential surface 134 of the outer roller and the non-load side roller guide section 114 are impeded from contacting each other.

Based on such findings, the clearance $\delta_1$ produced between the outer circumferential surface 134 of the outer roller and the non-load side roller guide section 114 when a torque is applied is set to be In a range of $\delta_1 > 0.03/A$ in this embodiment, in other words the clearance $\delta_1$ is set to be inversely proportional to the annularity A. As a result, the outer circumferential surface 134 of the outer roller and the non-load side roller guide section 114 are inhibited from contacting each other, to a maximal extent or completely, despite a variation of the annularity A of the outer roller 132, and therefore generation of the frictional force inside the joint is suppressed.

Also, in this embodiment, the clearance $\delta_2$ produced between the facet 139 of the outer roller and the track groove bottom portion 115 is set to be in a range of $\delta_2 > 0.15 \times A$, i.e. the clearance $\delta_2$ is set to be proportional to the annularity A. As a result, a contacting force between the facet 139 of the outer roller and the track groove bottom portion 115 is alleviated despite a variation of the annularity A of the outer roller 132, and therefore generation of the frictional force inside the joint is suppressed.

Setting thus the clearances $\delta_1$, $\delta_2$ appropriately according to the annularity A of the outer roller 132 allows further reducing the tertiary rotational axial force, thereby further improving the shudder suppressing effect and rotating durability. In addition, it is preferable to set the annularity A of the outer roller 132 in a range of 0.475≦A<1.

Although the present invention has been described based on various embodiments, it is to be understood that the present invention is not limited to the foregoing embodiments, but that various modifications may be made without departing from the spirit and scope of the present invention.

To cite a few examples, while the first reduced-thickness portion 116 and the second reduced-thickness portion 117 are formed in generally the same cross-sectional shape in the foregoing embodiments, the cross-sectional shape may be different from each other. Specifically, as shown in FIG. 19(A), the second reduced-thickness portion 117 may be formed to be narrower than the first reduced-thickness portion 116, and the second reduced-thickness portion 117 may be made shallower in groove depth than the first reduced-thickness portion 116. In this case, however, the work efficiency in fitting the boot 140 to the outer joint member 110 may be lowered. Also, as shown in FIG. 19(B), the second reduced-thickness portion 117 may be formed in a different cross-sectional shape such as a rectangular recess, instead of a curved recess. In this case, though the weight of the tripod type constant velocity universal joint can be reduced while securing sufficient retention capability of the boot 140, a clearance is prone to be produced between the outer joint member 110 and the boot 140 when fitting the boot 140 to the outer joint member 110, by which the sealing effect of the joint may be degraded.

In the foregoing embodiments, the roller guide section 114 and the outer circumferential surface 134 of the outer roller are given a generally the same generatrix curvature radius so as to closely contact each other, however the roller guide section 114 may be formed in a gothic arch shape, so as to achieve an angular contact between the outer circumferential surface 134 of the outer roller and the roller guide section 114.

Also, while the retainer 138 that retains the needle rollers 137 is integrally formed with the outer roller 132 in the foregoing embodiments, the retainer 138 may be separately fabricated and then attached to the outer roller 132. Further, the retainer 138 may be provided on the inner roller 131 instead of the outer roller 132.

What is claimed is:

1. A tripod type constant velocity universal joint, comprising:
    an outer joint member including three track grooves axially extending on an inner circumferential surface thereof;
    an inner joint member having three radially projecting trunnions;
    a boot fitted to an outer periphery of the outer joint member at an end portion and to a shaft extended from the inner joint member at another end portion so as to seal an inner region of the joint;
    wherein the outer joint member includes a first reduced-thickness portion on an outer periphery thereof in a region corresponding to the region between the track grooves and having a first axial length, and a second reduced-thickness portion on the outer periphery thereof in a region corresponding to the region where the track grooves are located and having a second axial length, said first axial length and said second axial length being substantially equal;
    wherein three of each of the first reduced-thickness portion and the second reduced-thickness portion are configured to alternately align in a circumferential direction at positions equally dividing a circumference of the outer joint member into six axially extending reduced-thickness portions of substantially equal length, each of the six axially extending reduced-thickness portions being separated by a maximum rotating diameter portion of the outer joint member; and
    the second reduced-thickness portion is of a groove shape axially extending with respect to the outer joint member.

2. The tripod type constant velocity universal joint according to claim 1, further comprising:
    a pair of roller guide sections located on the respective sides of the track grooves in a circumferential direction;
    an outer roller rotatably located inside the roller guide section of the track grooves; and
    an inner roller spherically fitted to a trunnion of the inner joint member so as to be pivotally rotatable, and to support the outer roller permitting relative rotation and relative axial movement;
    wherein a bottom portion of the track grooves of the outer joint member defines a flat plane directly connecting the roller guide sections and located directly opposite a facet of the outer roller, wherein the facet of the outer roller inclines relative to a longitudinal axis of the trunnion due to rotation of the inner joint member and the facet of the outer roller is supported by the bottom portion of the track groove when a torque is applied to the tripod type constant velocity universal joint while the outer joint member and the inner joint member are not in axial alignment.

3. The tripod type constant velocity universal joint according to claim 2, wherein a relief section having a smaller diameter than the inner circumferential surface of the inner roller is provided on a torque applying region of the trunnion of the inner joint member.

4. The tripod type constant velocity universal joint according to claim 1, wherein a relief section having a smaller diameter than an inner circumferential surface of an inner roller is provided on a torque applying region of the trunnion of the inner joint member.

* * * * *